(12) United States Patent
Nogawa

(10) Patent No.: US 11,726,730 B2
(45) Date of Patent: Aug. 15, 2023

(54) IMAGE FORMING DEVICE, AND NON-TRANSITORY COMPUTER-READABLE RECORDING MEDIUM FOR OBTAINING COMMUNICATION DESTINATION LIST IN WHICH STATUSES OF DEVICE AND TERMINAL DEVICES ARE STORED

(71) Applicant: BROTHER KOGYO KABUSHIKI KAISHA, Nagoya (JP)

(72) Inventor: Hideki Nogawa, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/704,379

(22) Filed: Mar. 25, 2022

(65) Prior Publication Data
US 2022/0308812 A1 Sep. 29, 2022

(30) Foreign Application Priority Data
Mar. 26, 2021 (JP) .................. 2021-052886

(51) Int. Cl.
*G06F 3/12* (2006.01)
(52) U.S. Cl.
CPC .......... *G06F 3/1256* (2013.01); *G06F 3/1204* (2013.01); *G06F 3/1292* (2013.01)
(58) Field of Classification Search
CPC ..... G06F 3/1256; G06F 3/1204; G06F 3/1292
USPC ....................................................... 358/1.1
See application file for complete search history.

(56) References Cited

U.S. PATENT DOCUMENTS

| | | | |
|---|---|---|---|
| 2009/0116066 A1* | 5/2009 | Nishitani | H04N 1/00278 358/1.15 |
| 2009/0201535 A1* | 8/2009 | Nagao | H04L 67/14 358/1.15 |
| 2009/0290193 A1 | 11/2009 | Ohba et al. | |
| 2017/0123739 A1* | 5/2017 | Konji | G06F 3/1236 |
| 2017/0230536 A1* | 8/2017 | Haapanen | G06F 3/1292 |
| 2020/0162633 A1* | 5/2020 | Ikeda | H04W 48/16 |
| 2021/0072712 A1* | 3/2021 | Minakuchi | H04W 4/80 |

FOREIGN PATENT DOCUMENTS

| | | |
|---|---|---|
| JP | 2009282890 A | 12/2009 |
| JP | 2010253724 A | 11/2010 |

* cited by examiner

*Primary Examiner* — Allen H Nguyen
(74) *Attorney, Agent, or Firm* — Scully, Scott, Murphy & Presser, PC

(57) ABSTRACT

An image forming device is provided with an image forming engine, a communication interface configured to communicate with terminal devices, and a controller. The controller is configured to perform obtaining, from an external device, a communication destination list in which statuses of the image forming device and one or more of the terminal devices are stored, and for each of the one or more of the terminal devices, executing a process corresponding to an instruction from the terminal device or restricting a process corresponding to the instruction from the terminal device depending on whether the terminal device is included in the communication destination list obtained in the obtaining.

24 Claims, 9 Drawing Sheets

COMMUNICATION DESTINATION LIST

| | MAC ADDRESS | CONTENT OF PROCESS | |
|---|---|---|---|
| | | PRINT | CHANGE OF SETTING |
| 1 | 01:01:XX:XX:XX:XX | ○ | ○ |
| 2 | 23:01:XX:XX:XX:XX | × | ○ |
| 3 | 01:A2:XX:XX:XX:XX | ○ | × |
| 4 | 01:B3:XX:XX:XX:XX | ○ | ○ |

FIG. 3

COMMUNICATION DESTINATION LIST

| | MAC ADDRESS |
|---|---|
| 1 | 01:01:XX:XX:XX:XX |
| 2 | 23:01:XX:XX:XX:XX |
| 3 | 01:A2:XX:XX:XX:XX |
| 4 | 01:B3:XX:XX:XX:XX |

FIG. 4

TERMINAL DB

| TERMINAL ID | USER ACCOUNT | PASSWORD | MAC ADDRESS/ Public Address | INSTALLED APPLICATION |
|---|---|---|---|---|
| TID01 | UID001 | XXXX | 01:01:XX:XX:XX:XX 23:01:XX:XX:XX:XX | APP1,APP2 APP3,... |
| TID02 | UID002 | XXXX | 01:A2:XX:XX:XX:XX 01:B3:XX:XX:XX:XX | APP1,APP2 |
| TID03 | UID003 | XXXX | 01:03:XX:XX:XX:XX | APP1,APP2 |

FIG. 5

PRINTER DB

| PRINTER ID | CHECKING DATE&TIME | COMMUNICATION DESTINATION LIST |
|---|---|---|
| PTIDXXXX1 | 2021-03-XX XX:XX | LISTID001 |
| PTIDXXX22 | 2021-03-XX XX:XX | LISTID001 |
| PTIDXXX35 | 2021-03-XX XX:XX | LISTID002 |
| ⋮ | ⋮ | ⋮ |

FIG. 6

IMAGE FORMING DEVICE, AND NON-TRANSITORY COMPUTER-READABLE RECORDING MEDIUM FOR OBTAINING COMMUNICATION DESTINATION LIST IN WHICH STATUSES OF DEVICE AND TERMINAL DEVICES ARE STORED

CROSS-REFERENCE TO RELATED APPLICATIONS

This application claims priority under 35 U.S.C. § 119 from Japanese Patent Application No. 2021-052886 filed on Mar. 26, 2021. The entire subject matter of the application is incorporated herein by reference.

BACKGROUND

The present disclosures relate to an image forming device and a non-transitory computer-readable recording medium containing computer-executable instructions to be executed by a controller (which serves as a computer) of the image forming device.

Conventionally, various technologies have been proposed for image forming devices in which filtering setting is available. The filtering setting is a setting to restrict communication with a communication destination device. Typically, such an image forming device is configured to make a filtering setting using a port number for communication. When a specific port number, for example, a port number of a RAW protocol to be used for printing, is changed from a default number to another number, the image forming device typically notifies the port number that will be enabled or disabled by the change of the filtering setting.

SUMMARY

The conventional image forming device as described above generally accepts a setting to connect or disconnect a communication according to the port number used by an application running on the image forming device. Incidentally, when there are multiple terminal devices that can make connection requests or print instructions to the image forming device, it may be desired to change the process to be executed by the image forming device according to the instructions from the multiple terminal devices.

According to aspects of the present disclosures, there is provided an image forming device which is provided with an image forming engine, a communication interface configured to communicate with terminal devices, and a controller. The controller is configured to perform obtaining, from an external device, a communication destination list in which statuses of the image forming device and one or more of the terminal devices are stored, and, for each of the one or more of the terminal devices, executing a process corresponding to an instruction from the terminal device or restricting a process corresponding to the instruction from the terminal device depending on whether the terminal device is included in the communication destination list obtained in the obtaining.

That is, according to the above configuration, depending on whether or not the terminal device is listed in the communication destination list, an instruction transmitted from the terminal device is processed or not. Thus, a process according to an instruction can be effectively managed depending on the terminal device that has issued the instruction.

According to aspects of the present disclosures, there is provided an image forming device having an image forming engine, a communication interface configured to communicate with a terminal device, and a controller. The controller is configured to perform obtaining a communication destination list in which at least a first terminal device is listed from among one or more terminal devices from an external device configured to obtain statuses of the image forming device and one or more terminal devices and store the obtained statuses. In response to an instruction from the first terminal device listed in the communication destination list obtained in the obtaining, the controller is configured to execute a process corresponding to the instruction from the first terminal device. Further, in response to an instruction from the second terminal device not listed in the communication destination list, the controller is configured to restrict a process corresponding to the instruction from the second terminal device.

That is, according to the above configuration, when the terminal device is listed in the communication destination list, an instruction transmitted therefrom is processed, while when the terminal device is not listed in the communication destination list, an instruction transmitted therefrom is not processed. Thus, a process according to an instruction can be effectively managed depending on the terminal device that has issued the instruction.

According to aspects of the present disclosures, there is provided an image forming device having an image forming engine, a communication interface configured to communicate with a terminal device, and a controller. The controller is configured to perform obtaining a communication destination list in which at least a first terminal device is not listed from among one or more terminal devices from an external device configured to obtain statuses of the image forming device and one or more terminal devices and store the obtained statuses. In response to an instruction from the first terminal device not listed in the communication destination list obtained in the obtaining, the controller is configured to execute a process corresponding to the instruction from the first terminal device. Further, in response to an instruction from the second terminal device listed in the communication destination list, the controller is configured to restrict a process corresponding to the instruction from the second terminal device.

That is, according to the above configuration, when the terminal device is not listed in the communication destination list, an instruction transmitted therefrom is processed, while when the terminal device is listed in the communication destination list, an instruction transmitted therefrom is not processed. Thus, a process according to an instruction can be effectively managed depending on the terminal device that has issued the instruction.

According to aspects of the present disclosures, there is provided a non-transitory computer-readable recording medium of a terminal device capable of communicating with an image forming device provided with an image forming engine, a communication interface configured to communicate with the terminal device, and a controller. The non-transitory computer-readable recording medium containing computer-executable instructions which cause, when executed by a computer of the terminal device, the computer to perform obtaining, from an external device, a communication destination list in which statuses of the image forming device and one or more of the terminal devices are stored, and causing the image forming device to executed, for each of the one or more of the terminal devices, a process corresponding to an instruction from the terminal device or restricting a process corresponding to the instruction from the terminal device depending on whether the terminal device is included in the communication destination list obtained in the obtaining.

That is, according to the above configuration, depending on whether or not the terminal device is listed in the communication destination list, an instruction transmitted from the terminal device is processed or not. Thus, a process according to an instruction can be effectively managed depending on the terminal device that has issued the instruction.

BRIEF DESCRIPTION OF THE DRAWING

FIG. 3 shows an example of a data structure of data stored in a communication destination list.

FIG. 4 shows another example of a data structure of data stored in a communication destination list.

FIG. 5 shows an example of a data structure of data stored in a terminal DB.

FIG. 6 shows an example of a data structure of data stored in a printer DB.

DETAILED DESCRIPTION OF THE EMBODIMENTS

First Embodiment

Figure 1:
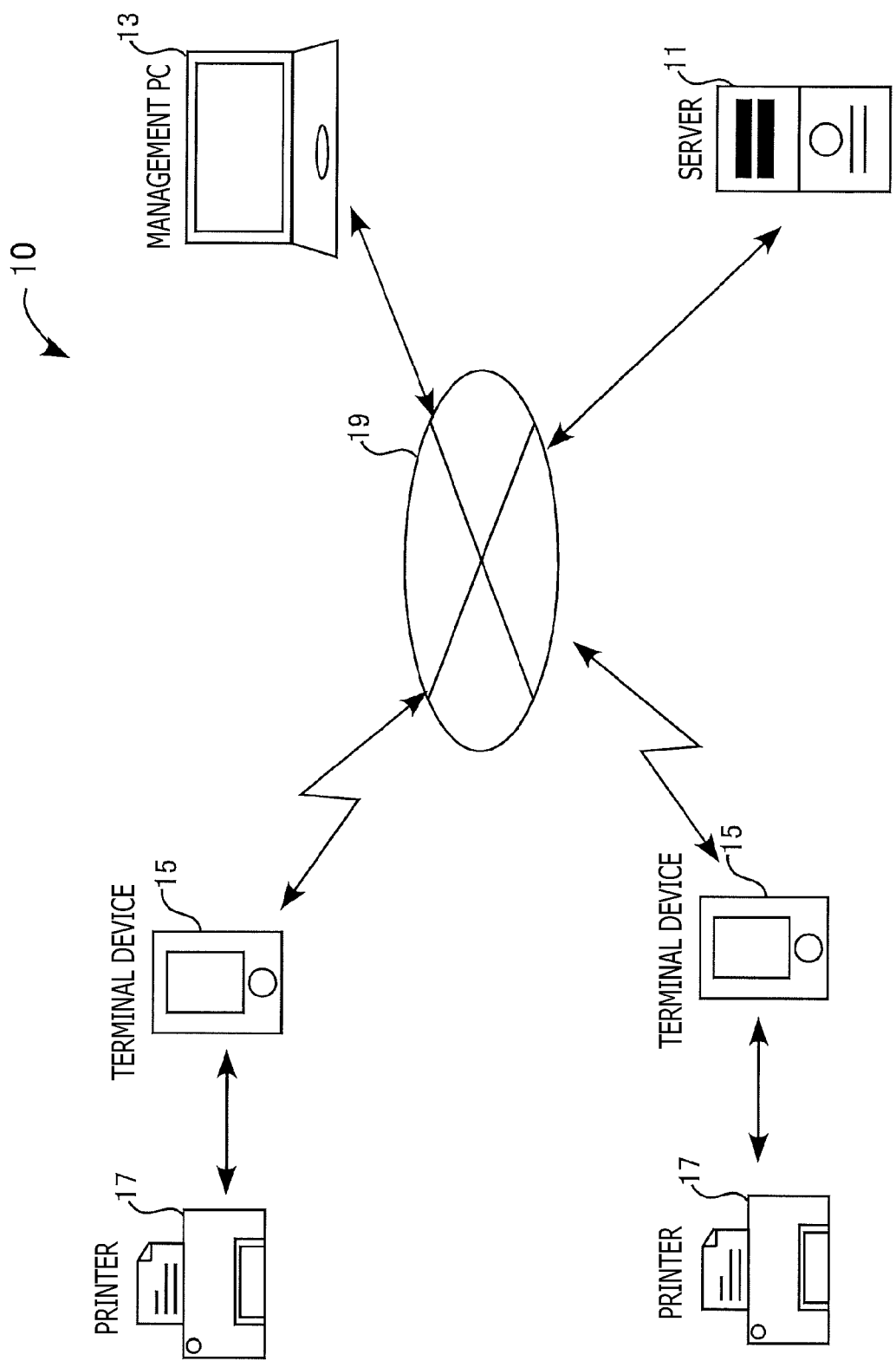
FIG. 1 schematically shows a configuration diagram of a printing system according to a first embodiment.
Figure 2:
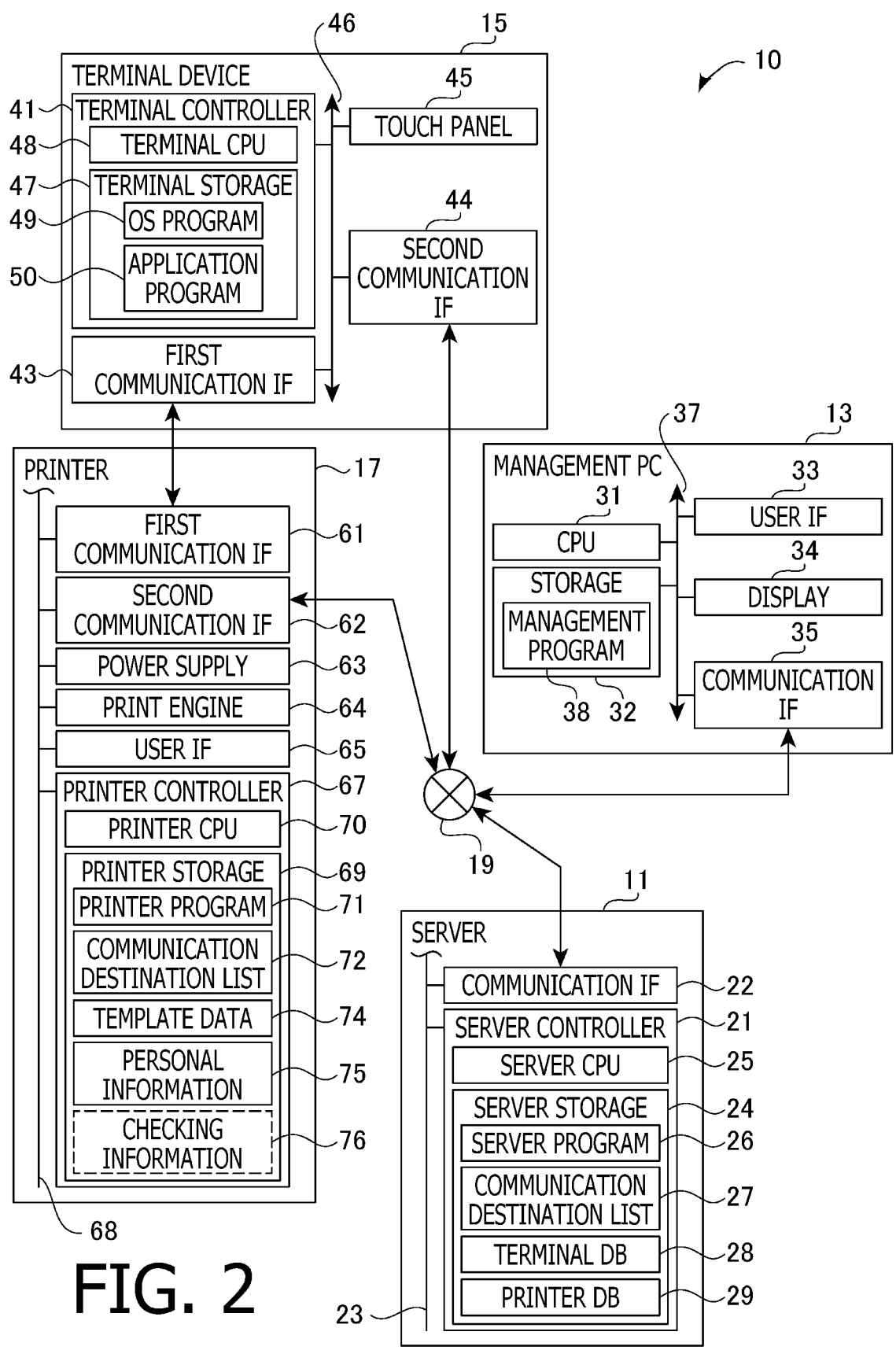
FIG. 2 is a block diagram of the printing system shown in FIG. 1.

Hereinafter, a printing system 10 according to a first embodiment will be described with reference to the accompanying drawings. As shown in FIGS. 1 and 2, the printing system 10 includes a server 11, a management PC 13, multiple terminal devices 15, and multiple printers 17. It is noted that FIG. 2 shows only one terminal device 15 and one printer 17 to avoid complications in the drawing. It is also noted that the printing system 10 may be configured with one terminal device 15 and one printer 17, with one terminal device 15 using multiple printers 17, or with multiple terminal devices 15 using one printer 17.

A company that uses the printing system 10 may lend the terminal device 15 and the printer 17 to a user (e.g., an employee in charge of sales). The user can perform printing with the printer 17 by operating the terminal device 15. The server 11 is, for example, a management server that manages the terminal devices 15. An administrator of the terminal devices 15 or the printers 17 (e.g., a system administrator of the company) can use a management function of the server 11 to restrict functions of the terminal device 15 by operating the management PC 13.

The server 11 is, for example, an MDM (Mobile Device Management) server that is configured to centrally manage a plurality of terminal devices 15 to be managed. The server 11 is equipped with a server controller 21 and a communication IF (abbreviation of interface) 22. The server controller 21 and other components are interconnected through a communication bus 23 so as to communicate with each other. The communication IF 22 is, for example, a LAN interface and is connected to a network 19. The network 19 is, for example, a wide area network (WAN) such as the Internet, a LAN, or a mobile communication network such as a 4G or 5G network.

The server controller 21 is configured to integrally control the server 11. The server controller 21 is provided with a server storage 24 and a server CPU 25. The server storage 24 is configured with, for example, a combination of a RAM, a ROM, and an HDD. In the server storage 24, a server program 26, a communication destination list 27, and a terminal DB (DB standing for database) 28, and a printer DB 29. The server program 26 is a program that causes the server 11 to perform various processes. For example, the server controller 21 causes the server CPU 25 to execute the server program 26 to control access to the server 11 and other operations. Further, the server controller 21 causes the server CPU 25 to execute the server program 26 to restrict functions of the terminal device 15, which is a target of management of the MDM server, based on instructions obtained from the management PC 13.

In the following description, the server controller 21, which executes the server program 26 on the server CPU 25, may be described simply by the name of the device or program. For example, a statement that "the server 11 obtains instructions from the management PC 13 via the communication IF 22" means that "the server controller 21 controls the communication IF 22 by causing the CPU 25 to execute the server program 26 and obtains instructions from the management PC 13 via the communication IF 22." The same applies to the management PC 13, which causes the CPU 31 to execute a management program 38 described later, to the terminal device 15, which causes the terminal CPU 48 to execute the OS program 49 and the application program (hereinafter, also referred to as an "application") 50, and to the printer 17, in which the printer CPU 70 executes a printer program 61. In addition, a term "obtain" or "acquire" in this application is used in a concept that does not require a request. That is, a process in which the server 11 receives instructions without a request is also included in the concept that "the server 11 obtains the instructions."

The communication destination list 27 is data that is to be transmitted from the server 11 to each printer 17. The printer 17 changes the processing for the terminal device 15, which is a communication destination, based on the communication destination list 27 obtained from the server 11 (i.e., the printer side communication destination list 72). A terminal DB 28 is the data for managing each terminal device 15. A printer DB 29 is data for managing the communication destination list 72 of each printer 17. The communication destination list 27, the terminal DB 28, and the printer DB 29 will be described in detail later.

Next, the management PC 13 will be described. In the descriptions of the management PC 13, the terminal device 15, and the printer 17 below, contents the same as those of the server 11 described above will be omitted as appropriate.

The management PC 13 is, for example, a notebook or desktop type personal computer. The management PC 13 has a CPU 31, a storage 32, a user IF 33, a display 34, and a communication IF 35, which are interconnected via a communication bus 37 so as to communicate with each other. The management PC 13 is configured to perform various processes as the CPU 31 executes the management program 38 stored in the memory 32. The management PC 13 is configured to change displayed contents on the display 34 in response to an operation input of the user IF 33 (e.g., a mouse, a keyboard). In addition, the management PC 13 is configured to be connected to the network 19 via the communication IF 35.

The terminal device 15 is, for example, a smartphone. It is noted that the terminal device according to the present disclosures is not necessarily limited to the smartphone, but can also be a tablet terminal, a notebook PC or the like. The terminal device 15 has a terminal controller 41, a first communication IF 43, a second communication IF 44, and a touch panel 45, which are interconnected via a communication bus 46 so as to communicate with each other.

The terminal controller 41 is configured to integrally control the terminal device 15 and is equipped with a terminal storage 47 and a terminal CPU 48. The terminal storage 47 is, for example, a combination of a RAM, a ROM, and the like. In the terminal storage 47, an OS program 49, an application 50, and the like are stored. The OS program 49 is a program configured to integrally control the terminal device 15, and provides basic functions and services to the application 50. The OS program 49 is, for example, Android (registered trademark) OS or iOS (registered trademark). When the terminal device 15 is a notebook PC, the OS program 49 is, for example, Windows (registered trademark) OS or the like.

The application 50 is a program provided, for example, by the vendor of the printer 17. The application 50 is configured to perform, with use of functions of the OS program 49 and the like, transmitting a print instruction to the printer 17, obtaining setting information of the printer 17, transmitting a setting instruction to the printer 17, and the like. The terminal controller 41 executes the OS program 49 and application 50 on the terminal CPU 48 to control operations of the terminal device 15.

Therefore, the server program 26 of the server 11 and the management program 38 of the management PC 13 contain MDM-compatible programs that can control the terminal devices 15 running on Android (registered trademark) OS, or the like. An administrator can operate the management PC 13 and with use of the MDM function of the server 11, perform various controls on the terminal devices 15. The various controls referred to here include, for example, function restrictions such as restriction of communication functions in respective target terminal devices 15 to be managed, deletion of data in the respective target terminal devices 15, management of restriction controls such as an initialization, a screen lock, a lost lock, and the like of the respective target terminal devices 15. It is noted that the server 11 may be a server capable of controlling at least one of the above restriction of functions, deletion of data, initialization, screen lock, lost lock, and other restrictions.

In addition to the MDM function, the server 11 is also equipped with a MAM (Mobile Application Management) function. The server 11 is configured to control, for example, an installation of the application 50 on the terminal device 15 and the setting of parameters at the time of installation, based on instructions from the management PC 13. The server 11 does not need to be equipped with the MAM function.

The first communication IF 43 is a communication interface capable of performing a short-range wireless communication according to, for example, the Bluetooth (registered trademark) standard. The terminal device 15 is configured to communicate with the first communication IF 61 of the printer 17 via the first communication IF 43, and transmit printing instructions and the like to the printer 17. The second communication IF 44 is a communication interface capable of performing communication with mobile communication system networks such as 4G and 5G networks, and the like, and wireless communication such as Wi-Fi (registered trademark). The terminal device 15 is connected to the network 19 via the second communication IF 44. The terminal device 15 can also communicate with the printer 17 via the second communication IF 44, and can transmit printing instructions and the like to the printer 17. It is noted that the terminal device 15 may also be connected to the network 19 by a wire.

The communication methods described above are only examples, and can be changed as necessary. For example, the communication standard of the first communication IF 43 is not necessarily limited to the Bluetooth (registered trademark) standard, but can be any other short-range wireless communication standard such as the NFC or the like. The second communication IF 44 may be configured to communicate with the second communication IF 62 of the printer 17 using, for example, a WFD (Wi-Fi Direct (registered trademark)) method developed by the Wi-Fi Alliance.

The terminal device 15 is configured to receive a user operation input via the touch panel 45. Further, the terminal device 15 is configured to display various information on the touch panel 45. It is noted that the user IF provided to the terminal device 15 is not necessarily limited to the touch panel 45, but can be button switches and/or slide switches in addition to or instead of the touch panel 45. The terminal device 15 may be equipped with a display device such as an LCD and an input device such as a keyboard separately instead of the touch panel 45.

The printer 17 according to the present embodiment is, for example, a portable printing device that can be carried about, and is configured to print the image data of a print job obtained through a wired or wireless communication with the terminal device 15 on a sheet (e.g., thermal printing sheet, or the like). The printer 17 has a first communication IF 61, a second communication IF 62, a power supply 63, a print engine 64, a user IF 65, and a printer controller 67, which are interconnected via a communication bus 68 so as to communicate with each other.

The first communication IF 61 is a communication interface configured to perform short-range wireless communication based on, for example, the Bluetooth (registered trademark) standard, and communicate with the first communication IF 43 of the terminal device 15. The second communication IF 62 is a communication interface configured to perform communication via a wireless LAN such as Wi-Fi (registered trademark) and/or a wired LAN. The printer 17 is configured to connect to the network 19 by, for example, connecting to an access point in a company or on provided to a place for a business trip via the second communication IF 62.

The power supply 63 is equipped with a power supply circuit or a battery that generates power to be supplied to each device in the printer 17 from, for example, the power of a commercial power supply. The printer 17 is a mobile printer that is configured to perform printing and other operations using the battery as a power source, and even when the printer 17 is not connected to the commercial power source, the printer 17 can perform the above operations. It is noted that the power supply 63 may be configured to have only one of the power circuit and the battery that can use the commercial power supply. The image forming device according to the present disclosures may be a portable image forming device such as a label printer, a receipt printer, another portable image forming device, a facsimile machine or a scanner that can be powered by a battery. Alternatively or optionally, the image forming device may be a stationary printer, or a multifunctional peripheral having printing, facsimile, scanner, and copying functions.

The print engine 64 according to the present embodiment is equipped with, for example, a thermal head or the like, and prints an image on the sheet in accordance with a direct thermal method. It is noted that the print engine 64 may be configured to print according to an electrophotographic method or an inkjet method. The user interface 65 is, for example, a touch panel, push button switches, and/or the like, and is configured to receive operation input by the user and/or display various information. It is noted that the printer 17 may be configured not to include a touch panel but equipped only with switches such as push-button switches and/or slide switches.

The printer controller 67 is configured to integrally control the printer 17. The printer controller 67 is equipped with a printer storage 69 and a printer CPU 70. The printer storage 69 is configured with a combination of a RAM, a ROM, and the like. The printer storage 69 is configured to store a printer program 71, a communication destination list 72, template data 74, and personal information 75. The printer program 71 is, for example, firmware configured to integrally control each component of the printer 17. The printer control section 67 executes the printer program 71 on the printer CPU 70 and controls the print engine 64, and the like. The communication destination list 72 is the information regarding the communication destination list 27 obtained from the server 11.

The template data 74 is, for example, data of templates used for printing fixed-form documents such as receipts and reports, and data used in regular documents such as letterheads with company logos. The personal information 75 is data to be inserted, for example, into the templates and the like, and includes information such as the name and affiliation of the user of the printer 17, names and addresses of customers, and the like. The printer 17 is configured to perform printing using, for example, the template and personal information specified in the print job. Alternatively, the printer 17 is configured to perform printing using a particular template or personal information based on a particular user operation to the user IF 65. The checking information 76 shown by broken lines in FIG. 2 will be described later, when a second embodiment is described. The printer 17 according to the first embodiment may be equipped with the checking information 76 and configured to operate using the checking information 76. Alternatively, the printer 17 according to the first embodiment may not be equipped with the checking information 76.

Communication Destination Lists 27 & 72, Terminal DB 28 and Printer DB 29

It is noted that the printer 17 according to the present embodiment is configured to obtain printing instructions and the like from the terminal device 15 via the first communication IF 43 and the second communication IF 44. Therefore, without any restriction, there is a possibility that the printer 17 obtains and executes the print instructions or the like from not only the terminal device 15 of a legitimate user but also unspecified terminal devices 15.

For example, a previous user of the company may connect the terminal device 15 to the printer 17 using the history of printer 17 in the past and execute printing. For example, a previous user of the company may connect the terminal device 15 to the printer 17 using the past history of the printer 17 and execute printing. In a case of a portable image forming device such as a mobile printer, the connection may be made by a third party other than the owner on a business trip or at a place of business. When the printer 17 is used illegally, there is a possibility that consumables such as sheets will be consumed by a third party, that parts such as the thermal head will deteriorate due to unintended use, or that personal information 75 will be leaked through printing or other means. Therefore, in the printing system 10 according to the present embodiment, the communication destination lists 27 and 72 are used to manage the terminal devices 15 that can be connected to the printer 17, and limit the terminal devices 15 that can be instructed to perform printing and the like. The communication destination list 72 is a copy of the communication list 27 which is stored in the server 11. For this reason, in the following description, the communication destination list 72 is mainly described, and the description of the communication destination list 27 is omitted as appropriate.

FIG. 3 shows an example of the data stored in the communication destination list 72. As shown in FIG. 3, the communication destination list 72 stores a plurality of MAC addresses, which are the MAC addresses of the LAN interfaces (e.g., communication interfaces for Wi-Fi (registered)) of the second communication IF 44 of the terminal device 15. Regarding the second communication IF for which the information on the MAC addresses are set in the communication destination list 27 (hereinafter referred to as "indicated on the communication destination list 27"), that is, the terminal devices 15 corresponding to the listed MAC addresses, the printer 17 allows connection to the second communication IF 62. On the other hand, regarding the terminal device 15 corresponding to MAC addresses which are not indicated on the communication destination list 72, the printer 17 rejects the connection to the printer 17. Therefore, the communication destination list 72 in the present embodiment is a so-called whitelist.

As shown in FIG. 3, the communication destination list 72 is configured such that information on contents of processes are associated with the plurality of MAC addresses, respectively. In the example shown in FIG. 3, two contents of "print" and "change of setting" are stored. When a terminal device 15 of each MAC address connects to the printer 17, and the printer 17 receives a print instruction or a setting change instruction from the connected terminal device 15, a process based on the instruction is permitted or not is indicated by the contents indicated in the communication destination list 72.

A symbol "O" in FIG. 3 indicates that the process is allowed, while a symbol "X" indicates that the process is not allowed. For example, when the terminal device 15 of which MAC address is "01:01XX:XX:XX:XX" (i.e., the top line in the communication destination list 72) connects to the printer 17, the printer 17 receives both the print instruction and instruction to change of the setting to the printer 17 itself as instructions after the connection, and executes processes according to the received instructions. On the other hand, when the terminal device 15 of which MAC address is indicated on the second line from the top, (i.e., "23:01:XX:

XX:XX:XX") connects to the printer 17, the printer 17 does not accept the print instruction but receives only the setting change instruction as the instructions after the connection. In this way, the printer 17 can change the contents of processes to be allowed for each terminal device 15.

The content of the communication destination list 72 shown in FIG. 3 is an example. The contents of processes are not necessarily limited to the two contents described above, but can also include a print preview process, a printing process using template data 74, and the like. When the printer 17 has functions other than printing, a scanning function, a facsimile function, and the like may also be adopted as the process contents of the communication destination list 72.

The communication destination list 72 shown in FIG. 3 shows a case where the MAC address (LAN interface) of the second communication IF 44 is used. However, the same setting can be made when other communication methods are used. For example, when the first communication IF 43 of each terminal device 15 performs the communication in accordance with the Bluetooth (registered trademark) standard, the communication destination list 72 may be configured to show a physical address (Public Address) intrinsic to the Bluetooth (registered trademark) communication interface. In such a case, similar to a case where the MAC addresses are indicated, the public addresses to which the connection is permitted may be indicated in the communication destination list 72. Alternatively, when using the NFC method of communication as a short-distance wireless communication, the NFCID may be used as information to identify the terminal device 15 and listed in the communication destination list 72.

In the example shown in FIG. 3, the MAC address to which the connection is permitted is associated with the processing contents and set in the communication destination list 72. As shown in FIG. 4, only MAC addresses to which the connection is allowed may be set in the communication destination list 72. In this case, the printer 17 may permit the connection only to the terminal device 15 listed in the communication destination list 72, and after connection, printing and setting change processes are permitted uniformly. In such a case, when the printer 17 receives a connection, the printer 17 may check only the MAC address of the terminal device 15 from which the connection is made in the communication destination list 72, and when the MAC address of the terminal device 15 is listed in the communication destination list 72, the printer 17 may execute all instructions from the connected terminal device 15 in the subsequent processing.

Alternatively, the MAC address may not be indicated in the communication destination list 72. That is, the printer 17 may be configured to permit the connection of the terminal device 15 from which the connection instruction is received, but whether the printing process and the setting change process are executed or not after the connection may be determined based on the communication destination list 72. Therefore, "instructions from the first terminal device" in the present disclosures is not necessarily limited to the connection instruction, but may include other instructions such as printing instruction or setting change instruction.

In the examples shown in FIGS. 3 and 4, as the communication destination list 72, a so-called whitelist which indicates the MAC addresses to which the connections are allowed is used. However, the communication destination list 72 is not necessarily limited to the whitelist as described above. That is, a so-called a blacklist, which indicates MAC addresses to which the connections are not allowed, may be used as the communication destination list 72. In this case, when, for example, the list of MAC addresses shown in FIG. 4 is used as the blacklist, the printer 17 does not allow the terminal devices listed in the destination list 72 to be connected to the printer 17. On the other hand, the printer 17 permits the connection of terminal devices 15 which are not listed in the communication destination list 72. Even in the case where the blacklist is used, the process contents to be permitted for the terminal device 15 after connection may be set in the communication destination list 72. Further, the printer 17 may be configured to switch between a mode in which the whitelist is used and a mode in which the blacklist is used.

FIG. 5 shows an example of the data for managing the terminal device 15 stored in the terminal DB 28. As shown in FIG. 5, the terminal DB 28 contains, for example, a terminal ID, a user account, a password, a physical address, an installed application, and other information are stored in an associated manner. The terminal ID is, for example, a serial number of the terminal device 15 assigned by the vendor of the terminal device 15, and is a unique piece of information that can identify the terminal device 15 from other terminal devices. The user account is the account name of a user who is authorized to use the terminal device 15. The password is the password of the user account. The physical address includes addresses of the communication interfaces of the terminal device 15, more concretely, the MAC address of the first communication IF 43 and the Public Address of the second communication IF 44. The installed application is information indicating the type of the applications (including the application 50) installed in the terminal device 15.

The applications installed in the terminal device 15 are installed or uninstalled by the server 11 through the MDM function, as described above. When the server 11 receives an instruction for the terminal device 15 from the management PC 13 and executes the same, the server 11 updates information of the terminal DB 28. It is noted that the configuration shown in FIG. 5 is only an example. The server 11 may be configured to store information indicating whether the data of the terminal device 15 has been initialized, whether the screen lock has been performed, in the terminal DB 28 with use of the MDM function.

FIG. 6 shows an example of data stored in the printer DB 29. Information regarding the communication destination lists 27 and 72 of printers 17 is stored in the printer DB 29. The server 11 according to the present embodiment performs not only management of the status of the terminal device 15 using the terminal DB 28, but also management of the status of the printer 17. As shown in FIG. 6, in the printer DB 29, a printer ID, checking date and time, and the communication destination list are stored in association with each other.

The printer ID is, for example, a serial number assigned to the printer 17 by the vendor of the printer 17, and is unique information that can identify the printer 17 from other printers. The checking date and time is the information of the date and time when the authenticity of the destination list 27 is checked by the authenticity processing (S29 in FIG. 7) described below. The communication destination list is information of the list name of the communication destination list 27 that was transmitted to the printer 17, i.e., information of the name of the communication destination list 72 retained by the printer 17.

The server 11 may have multiple types of communication destination lists 27 and may be configured to use different communication destination lists 27 for each printer 17, or use the same communication destination list 27 for all the printers 17. For example, a large company may prepare different destination lists for each department, while a small company may use the same destination list 27 for all printers 17. In contrast, a small company may use the same communication destination list 27 for all printers 17, and update the destination list 27 in a batch to implement connection restriction and process contents restriction (hereinafter, occasionally referred to as a connection restriction).

Communication Destination List Process

Figure 7:
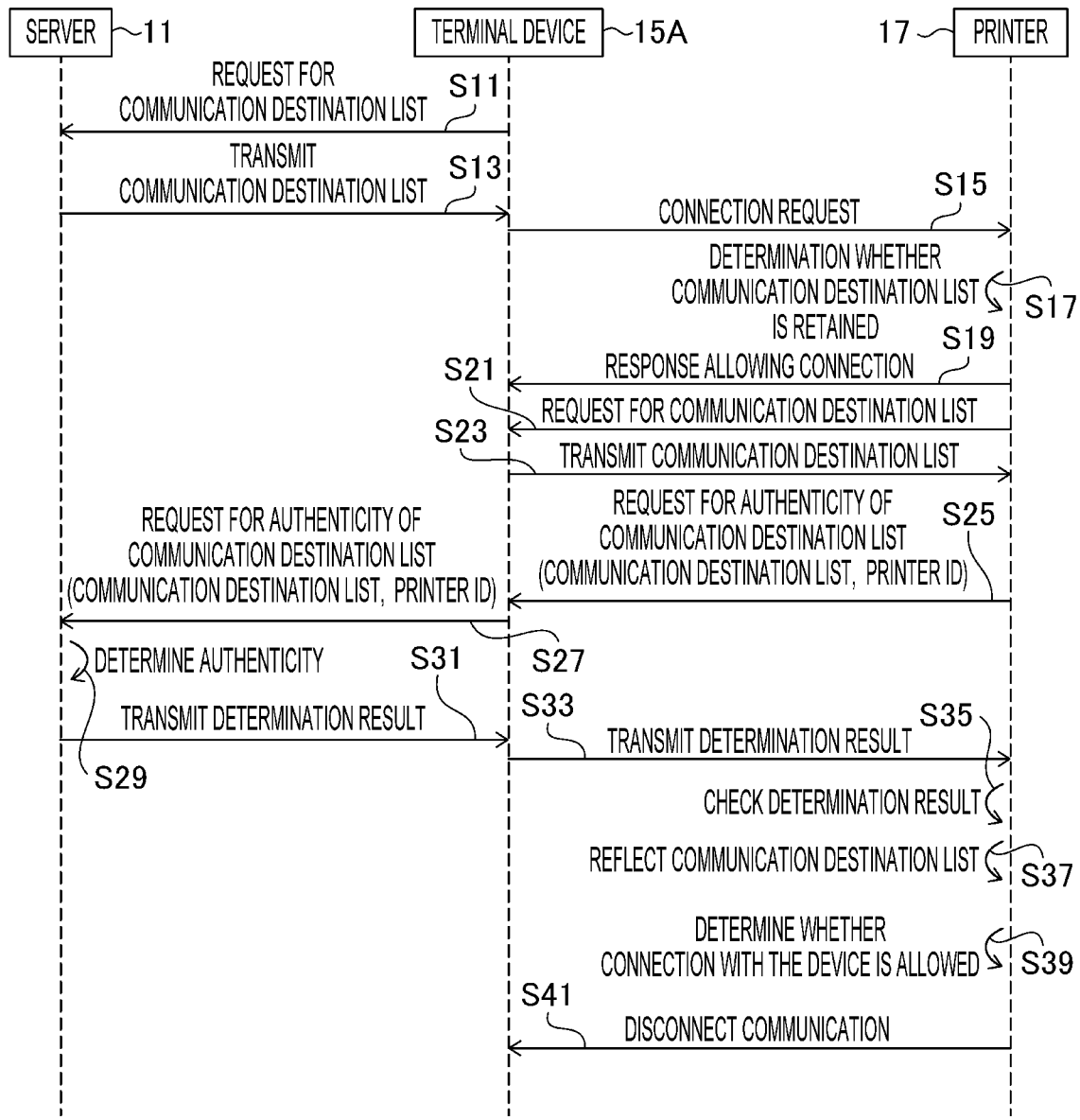
FIGS. 7 and 8 show a sequence diagram illustrating processes of a server, the terminal device, and the printer in a communication destination list process.
Figure 8:
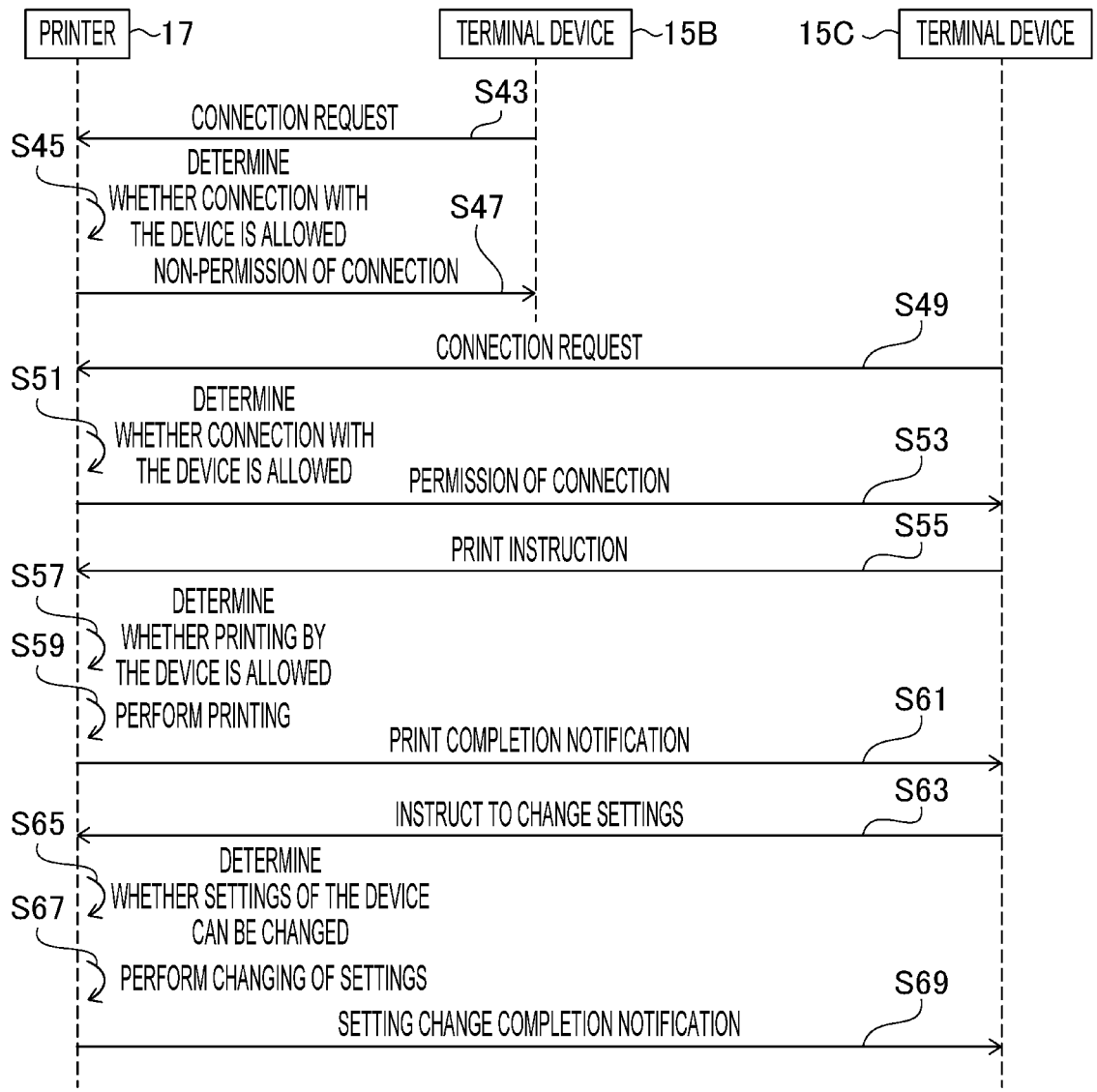

FIGS. 7 and 8 show processes of the server 11, the terminal device 15, and the printer 17 in the communication destination list process. By executing the communication destination list process, the printing system 10 restricts the terminal devices 15 connectable to the printer 17 based on the communication destination lists 27 and 72, and restricts the processing contents the terminal devices 15 after connection can instruct the printer 17.

It is noted that the sequence diagrams in the drawings basically show processes of the CPUs (i.e., the server CPU 25, the CPU 31, the terminal CPU 48 and the printer CPU 70) in accordance with the instructions described in respective programs. Accordingly, the processes such as "request," "transmit," "determine," and the like in the following description represent the processes performed by the CPUs. It is further noted that the processes by the CPUs include hardware control via program(s). Further, the term "data" in this specification is represented by a computer-readable bit string, and data with the same substantive meaning but different format will be treated as the same data. The same applies to the term "information" in this specification.

In the following description, a case where the MAC address of the Wi-Fi (registered trademark) wireless communication interface is set in the communication destination list 27, and the connection restriction and the restriction of the processing contents are performed based on the MAC address will be described. It is noted that, in a case where other physical addresses are used (i.e., when the Public Address of the Bluetooth (registered trademark) is used), the connection restriction and the like can be performed similarly.

In the following description, a case where three terminal devices 15 are connected to the printer 17 will be described. In order to distinguish the three terminal device 15 from each other, the three terminal devices 15 will be referred to as terminal devices 15A, 15B and 15C. When the terminal devices 15A, 15B and 15C are collectively referred to without distinction, they are described as terminal devices 15.

In the following example, the terminal device 15A is that of the system administrator, and the MAC address information of the terminal device 15A is not listed in the communication destination list 7. The terminal device 15B is, for example, a terminal device 15A of an employee who is not allowed to use the printer 17 or a terminal device 15B of a third party outside the company, and is not listed in the communication destination list 72. The terminal device 15C is the terminal device 15C of the user of the printer 17, and is listed in the communication destination list 72.

In addition, it is assumed that, as an initial state, the communication destination list 72 is not stored in the printer controller 67. In the following description, a case where the communication destination list 72 is the whitelist is mainly described, but process can be performed in an analogized manner when the communication destination list 72 is the blacklist.

As shown in S11 (hereinafter, an abbreviated form of "S" will be used for "step") of FIG. 7, the terminal device 15A transmits an instruction to the server 11 to request for the communication destination list 27 via the network 19 (hereinafter, transmission of such a requesting instruction may be simply described as "request"). When, for example, the application 50 is started, the terminal device 15 executes S11 to request for the communication destination list 27. Alternatively, the terminal device 15 may request for the communication destination list 27 in response to an operation input to the touch panel 45 after the terminal device 15 started the application 50. The terminal device 15A executes the processes from S11 onward by causing the terminal CPU 48 to execute the application 50.

In response to obtaining of the request in S11, the server 11 transmits the communication destination list 27 to the terminal device 15A (S13). When, for example, the same communication destination list 27 is used by all employees, only one communication destination list 27 is stored in the server storage 24, and the server 11 transmits the communication destination list 27 as stored to the terminal device 15 (S13). Alternatively, the server 11 may obtain the terminal ID of the terminal device 15A or the printer ID of the printer 17 from the terminal device 15A, identify the communication destination list corresponding to the obtained terminal ID or the printer ID, and transmit the thus identified communication destination list 27 to the terminal device 15A.

When obtaining the communication destination list 27 in S13, the terminal device 15A transmits a connection request to the printer 17 in accordance with the Wi-Fi (registered trademark) communication via network 19 (S15). The method of designating the printer 17 to which the communication destination list 27 is transmitted is not particularly limited. The terminal device 15 may transmit the communication destination list 27 to the printer 17 set in the print settings of the application 50, that is, the printer 17 currently selected or the default printer 17. Alternatively, the terminal device 15 may, for example, search for printers 17 in the same LAN, display a list of the searched printers 17, and receive a user's selection of one of the printers 17 to which the communication destination list 27 is transmitted.

When receiving the connection request, the printer 17 determines whether the printer 17 itself holds the communication destination list 72 (S17). Since the printer 17 does not hold the communication destination list 72, the printer 17 transmits a response allowing the connection to the terminal device 15A (S19). It is noted that, when the printer 17 has already held the communication destination list 72, the printer 17 determines whether to allow the connection of the terminal device 15A based on the communication destination list 72. The process of determining whether or not to allow the connection using the communication destination list 72 will be described later.

The printer 17 requests the terminal device 15A for the communication destination list 27 (S21). Therefore, in a state where the printer 17 does not hold the communication destination list 72, the printer 17 permits the connection in response to the connection request (S19) and requests the terminal device 15 (in this case, the terminal device 15A) (S21) without determining whether the connection is to be permitted, in other words, regardless of whether the terminal device 15, from which the connection request has been received, is listed in the communication destination list 27 of the server 11.

In this way, the connection is permitted to all the terminal devices 15 that are capable of communicating with the printer 17 (i.e., capable of transmitting a connection request), and the communication destination list 27 can be obtained from the server 11 via the terminal devices 15. For example, even when the printer 17 is not connected to the Internet (i.e., not connected to the server 11), the communication destination list 27 can be obtained via the terminal device 15.

It is noted that the conditions for allowing the connection of the terminal device 15 without determining whether or not the connection is permitted and for obtaining the communication destination list 27 from the terminal device 15 are not limited to the condition in which the communication destination list 27 is not held as described above.

For example, the printer 17 may shift its status to a status in which the connection is allowed without determining whether or not the connection is permitted, and obtains the communication destination list 27 via the terminal device 15 when one of the following conditions: the printer 17 is powered on; a particular time has elapsed since the communication destination list 27 was obtained; an instruction to obtain the communication destination list 27 has been received from the user.

For example, the printer 17 may be configured to discard the communication destination list 72 of itself each time the power is turned off. Then, when the printer 17 is powered on, the printer 17 may enter a state of allowing the connection, and may allow connections from all the terminal devices 15 that can communicate with the printer 17 and acquire the communication destination list 27 therefrom. When, for example, the printer 17 is in an environment where the printer 17 is connected to the server 11 via the terminal device 15 every time the printer 17 is powered on, the latest communication destination list 27 can always be used by discarding the communication destination list 72 every time the printer 17 is power off.

Alternatively, the printer 17 may discard/disable the communication destination list 72 when a first time period has elapsed since the printer 17 obtained the communication destination list 27 and reflected the same in the device settings. Then, when a second time period has elapsed since the printer 17 obtained the communication destination list 27, the printer 17 may enter a state of allowing the connection without determining whether the connection is permitted, allow the connection from the terminal device 15 that is capable of communicating with the printer 17, and obtain the communication destination list 27. It is preferable that the second time period is shorter than the first time period. In this way, an effective time of the communication destination list 72 is set to the first time period, and the communication destination list 72 can be updated based on the elapse of the second time period, before the first time period elapses. When the data of the communication destination list 27 has erased from the printer storage 69 for some reason, the printer 17 may allow a connection from the terminal device 15 and obtain the communication destination list 27.

The printer 17 may be configured to receive an instruction to obtain a new communication destination list 27 in response to an operation input to the user IF 65. In this case, the printer 17 may discard the communication destination list 72 therein when the printer receives the instruction. As a result, the printer 17 is in a state where the communication destination list 72 not held therein and the connection from the terminal device 15 is permitted without determining whether the connection is permitted or not.

Optionally or alternatively, in response to receipt of the instruction, the printer 17 may be configured to shift to a state in which the connection of the terminal device 15 is permitted regardless of whether or not the communication destination list 72 is retained, or regardless of the contents of the retained communication destination list 72.

The printer 17 may be configured to shift to a state in which the connection is permitted based on a specific operation, such as an operation of pressing the power button for three seconds or longer. In addition, the printer 17 may shift to the state where the connection is permitted on condition that the EWS (Embedded Web Server) or other internal server of the printer 17 is accessed to change the settings stored therein. This allows the communication destination list 27 to be updated based on the user's operation.

When the terminal device 15A obtains the request in S21, the terminal device 15A transmits the communication destination list 27, which was obtained from the server 11 in S13, to the printer 17 (S23). When the printer 17 obtains the communication destination list 27 from the terminal device 15A, the printer 17 transmits an authenticity request to the server 11 for asking the sever 11 to examine authenticity of the obtained communication destination list 27.

When the printer 17 obtains the list of communication destinations 27 from the terminal device 15A, it sends a request for authenticity to the server 11 via the terminal device 15A to inquire about the authenticity of the list of communication destinations 27 (S25, S27).

By executing S25, the printer 17 asks the server 11 whether the communication destination list 27 obtained via the terminal device 15A is the same as the communication destination list 27 transmitted from the server 11 to the terminal device 15A, that is, whether or not communication destination list 27 obtained via the terminal device 15A is a legitimate communication destination list 27.

In S25 and S27, the printer 17 transmits the communication destination list 27 obtained in S3 and the printer ID of the printer 17 itself to the server 11 together with the authenticity request. When receiving the authenticity request from the terminal device 15 in S27, the server 11 determines the authenticity of the communication destination list 27 (S29). Then, the server 11 transmits the result of the determination of the authenticity to the printer 17 via the terminal device 15A (S31, S33). The printer 17 checks the determination result obtained from the server 11 (S35).

In S29, the server 11 determines whether the communication destination list 27 obtained from the printer 17 is included in the communication destination list 27 stored in the server storage 24 of the sever 11 itself. When the communication destination list 27 obtained from the printer 17 is determined to be included in the communication destination list 27 stored in the server storage 24, the server 11 transmits the determination result indicating that the communication destination list 27 is the legitimate communication destination list 27, that is, the destination list 27 is the one transmitted from the server 11 itself to the terminal device 15A (S31, S33).

In this case, the printer 17 determines, in S35, that communication destination list 27 is the legitimate communication destination list 27 and reflects the communication destination list 27 obtained from the terminal device 15A as the communication destination list 72 in the settings of the printer 17 (S37). Then, the printer 17 performs the connection restrictions and the like, using the communication destination list 72 reflected in the settings, in subsequent communications with the terminal device 15.

The server 11 stores, in the printer DB 29, the printer ID obtained in S27, the checking date and time when the authenticity is checked in S29, and the list name of the communication destination list 27 with which the authenticity is checked (see FIG. 6). This allows the server 11 to manage the communication destination list 72 based on the printer DB 29.

When it is determined, In S29, that the communication destination list 27 obtained from the printer 17 is not included in the communication destination list 27 stored in the server 11 itself, the server 11 transmits a determination result, to the printer 17, indicating that the communication destination list 27 is not a legitimate communication destination list 27, that is, the communication destination list 27 is a list that has not been transmitted from the server 11 to the terminal device 15A (S31, S33).

In this case, the printer 17 determines, in S35, that the list is not the legitimate communication destination list 27, discards the communication destination list 27 obtained from the terminal device 15A, and does not reflect the same in the settings. The printer 17 maintains the status of not retaining the communication destination list 72, allows the connection from the terminal device 15A and the like, and enters a state of obtaining the communication destination list 27. This prevents a non-authorized communication destination list 27, which has not been transmitted by the server 11, from being reflected in the settings of the printer 17. Further, this prevents legitimate users from being unable to use the printer 17. Furthermore, the above also prevents unauthorized use of the printer 17 by users who are not authorized to use it.

The method of checking the authenticity of the communication destination list 27 is not limited to the above method of checking whether or not the communication destination list 27 obtained from the terminal device 15A is the same as the destination list 27 maintained by the server 11.

For example, the server 11 may keep the terminal ID of the terminal device 15A to which the communication destination list 27 is transmitted in S13 and the information of the transmitted communication destination list 27 as history information. Then, in S29, the server 11 may determine that the communication destination list 27 is the legitimate list when the terminal ID of the device 15A from which the authenticity request of S27 was obtained and the communication destination list 27 are remained in the history information.

After the printer 17 has reflected the communication destination list 27 as the communication destination list 72 in S37, the printer 17 determines whether the terminal device 15A, which is currently connected, is a device to which the connection is permitted based on the reflected communication destination list 72 (S39). As described above, the terminal device 15A is not listed in the communication destination list 72.

For example, the terminal device 15A is a terminal of the system administrator who sets the communication destination list 72 for the printer 17, and is not the terminal of the user who uses the printer 17 for printing, and the like, and therefore is not listed in the communication destination list 72. Therefore, the printer 17 disconnects the Wi-Fi (registered trademark) communication with the terminal device 15A (S41). That is, after obtaining the communication destination list 27, when the connection is kept with the terminal device 15A which is not listed in the communication destination list 27, the connection is disconnected (S41). In addition, when the terminal device 15A other than the terminal device 15A that was relayed to obtain the communication destination list 27 from the server 11 is connected, the communication may be disconnected after setting the communication destination list 72, if the terminal device is not listed in the communication destination list 72.

In addition, when the printer 17 updates the communication destination list 72, the printer 17 may disconnect the communication with the terminal device 15 that is listed in the old communication destination list 72 but is not listed in the new communication destination list 72.

The same procedure can be applied when the communication destination list 72 is the blacklist. In this case, however, the terminal device 15A is a terminal device listed in the destination list 72 (i.e., the terminal device for which the connection is not permitted). Since the terminal device 15A currently connected is listed in the communication destination list 72 (S39), the printer 17 disconnects the communication with terminal device 15A (S41).

Regarding the communication between the terminal device 15 and the printer 17 via the network 19 (router, or the like), the method according to which the printer 17 obtains the MAC address of the terminal device 15 in is not necessarily limited to a particular method. For example, when the printer 17 can detect the MAC address of the terminal device 15 from the communication data transmitted and received between the terminal device 15 and the printer 17, the printer 17 may use the MAC address for the determination process of S39. Alternatively, the printer 17 may be configured to transmit an ARP (Address Resolution Protocol) request to identify the MAC address from the IP address of the terminal device 15. Alternatively, the printer 17 may inquire the application 50 of the terminal device 15 for the MAC address of the terminal device 15.

Next, referring to FIG. 8, the process after reflecting the communication destination list 72 will be described. For example, the printer 17 disconnects communication with the terminal device 15A in S41 of FIG. 7, the printer 17 obtains a connection request from the terminal device 15B via the network 19 (S43). When obtaining the connection request, the printer 17 determines whether the MAC address of the terminal device 15B is listed in the communication destination list 72, and determines whether or not the terminal device 15B is a device to which the connection may be permitted (S45). Since the terminal device 15B is not listed in the communication destination list 27, the printer 17 notifies the terminal device 15B that the connection is not permitted and rejects the connection (S47).

When the printer 17 receives, in the TCP/IP protocol communication between the printer 17 and the terminal device 15B, a packet from the terminal device 15B requesting the establishment of a connection (S43), the printer 17 responds to transmit a packet (RST packet) that rejects the establishment of the connection (S47). Alternatively, the printer 17 may discard the connection request of S43 and notify a communication error or the like to the application 50 of the terminal device 15B (S47). Further alternatively, the printer 17 may not execute the notification to the terminal device 15B in S47 and discard the connection request of S43.

Similarly, in the Bluetooth (registered trademark) standard communication, the connection can be rejected based on the communication destination list 72. For example, when the printer 17 receives a pairing request through the Bluetooth (registered trademark) standard communication (S43), the printer 17 may reject the pairing request (S47). Further, regardless of the connection request, for printing instructions and setting change instructions, the printer 17 may reject such instructions from the terminal device 15B that is not listed in the communication destination list 72.

The same procedure may be performed when the destination list 72 is the blacklist. In this case, the terminal device 15B is the terminal device 15 listed in the communication destination list 72. Since the terminal device 15B from which the connection request is received in S43 is listed in the communication destination list 72 (blacklist) (S45), the printer 17 rejects the connection with terminal device 15B (S47).

On the other hand, when the printer 17 obtains the connection request from the terminal device 15C listed in the communication destination list 72 (S49), the printer 17 determines that the terminal device 15C is a device that may be connected based on the communication destination list 72 (S51) and permits the connection (S53). The same procedure can be performed when the communication destination list 72 is the blacklist. In such a case, terminal device 15C is a terminal device 15 that is not listed in the communication destination list 72 (blacklist). When the printer 17 receives the connection request of S49, since terminal device 15C is not listed in the communication destination list 72 (S51), the printer 17 permits the connection (S53).

After establishing the connection in S53, when the printer 17 obtains a print instruction from the terminal device 15C (S55), the printer 17 determines whether or not the terminal device 15C is a device that is allowed to perform printing based on the communication destination list 72 (S57). At this stage, the printer 17 checks the processing contents associated with the MAC address of the terminal device 15C in the communication destination list 72 (see FIG. 3).

When the terminal device 15C is allowed to print (marked as "O" in FIG. 3), the printer 17 executes printing based on the print instruction (S59). When printing is completed, the printer 17 transmits a completion notification to the terminal device 15C (S61). According to the above configuration, the printer 17 can execute printing instructions only from the terminal device 15 that is allowed to print in the communication destination list 72. It is noted that when the terminal device 15C is not permitted to print in the communication destination list 72, the printer 17 does not perform printing and, for example, transmits a print error notification to the application 50 of the terminal device 15C. Alternatively, the error notification may be displayed on the user IF 65 of the printer 17 itself without transmitting a response to the terminal device 15. In the case of using the communication destination list 72 with only the MAC address as shown in FIG. 4, when the printer 17 receives a print instruction (S55) after establishing a connection in S53, the printer 17 executes printing without performing the determining process in S57 (i.e., determination of the processing contents) and executes printing.

The same process can be performed when the communication destination list 72 is the blacklist. In such a case, in the destination list 72 (which is the blacklist), the processing contents allowed to be performed by the terminal device 15 that is allowed to connect may be set separately from the MAC addresses in the blacklist for denying the connection. Then, the printer 17 may determine whether or not to allow printing for the terminal device 15C, and the like to which the connection is allowed based on the information of the processing contents which are set separately from the blacklist. Alternatively, when the communication destination list 72 which is the blacklist with only MAC addresses set, as shown in FIG. 5, is used, and when the printer 17 receives the print instruction (S55) after connecting to the terminal device 15C which is not listed in the communication destination list 72, the printer 17 may perform printing (S59) without performing the determining process of S57.

The printer 17 can also process instructions to change the settings in the same way as printing instructions. When the printer 17 obtains an instruction to change the settings from the terminal device 15C (S63), the printer 17 determines whether or not the terminal device 15C is a device by which the setting change may be executed (S65) based on the communication destination list 72. When the printer 17 is allowed to change the settings by the terminal device 15C, the printer 17 executes the setting change based on the received instruction (S67). For example, the printer 17 may accept changes of the setting of the time, changes of the contents of the template data 74 and personal information 75, and change of the IP address and the like. When the printer 17 completes the setting change, the printer 17 transmits a completion notification to the terminal device 15C (S69). According to the configuration, the printer 17 can permit only the terminal devices 15 to which permission is given in the communication destination list 72 to change the settings.

When the terminal device 15C is not permitted to change the settings in the communication destination list 72, the printer 17 does not change the settings and notifies the terminal device 15C of the error. It is noted that, similar to a case of the print instruction described above, when the destination list 72 is a blacklist, control based on the blacklist can be performed for the setting change instruction.

According to the first embodiment described above, the following effects can be obtained.

(1) The printer 17 according to the present embodiment is configured to obtain the communication destination list 72 (communication destination list 27) from the server 11 that is configured to obtain and store the status of the printer 17 and at least one or more terminal devices 15 (S13, S23). When the communication destination list 72 obtained in S23 is a so-called whitelist, in response to the instructions (e.g., the connection request in S49, the print instruction in S53, the setting change instruction in S63) received from the terminal device 15C listed in the communication destination list 72, the printer 17 executes processes (S53, S59, S67) corresponding to the instructions. On the other hand, the printer 17 does not perform processes corresponding to the instructions (e.g., the connection request and the like) from the terminal device 15B that is not listed in the communication destination list 72 (S47).

According to the above configuration, when instructions are obtained from any of the plurality of terminal devices 15, the processing content to be executed by the printer 17 can be changed according to the communication destination list 72 obtained from the server 11.

There could be a case where the printer 17 receive a connection request or a print instruction from an unspecified user when there are multiple users who may use the printer 17, or the printer 17 is taken out for use. In such a case where there are multiple terminal devices 15 that can make connection requests and print instructions to the printer 17, it is possible the processes to be executed by printer 17 in response to instructions from multiple terminal devices 15A, 15B, and 15C can be changed according to the communication destination list 72 obtained from the server 11. Thus, the processing of the printer 17 can be managed by the server 11. Accordingly, the system administrator or the like can integrally manage the communication destination lists 27 (i.e., operations) of the multiple printers 17 by setting and/or changing the communication destination list 27 of the server 11.

(2) The printer 17 obtains the communication destination list 72 from the server 11 via the terminal device 15A in S13 and S23. When the obtained communication destination list 72 is a whitelist and the terminal device 15A is not listed in the communication destination list 72, the printer 17 disconnects communication with the terminal device 15A after obtaining the communication destination list 72 (S41). According to this configuration, the terminal device 15A currently connected to obtain the communication destination list 72 will also be disconnected when the terminal device 15A is not listed in the communication destination list 72 even if the connection is in progress. In this way, after obtaining the communication destination list 72, only the terminal devices 15 listed in the communication destination list 72 can be connected to the printer 17.

(3) Also, when the destination list 72 is a so-called blacklist, connection restrictions and the like can be processed in the same way as in the case of the whitelist described above. For example, the printer 17 executes the process corresponding to the instruction from the terminal device 15C that is not listed in the obtained communication destination list 72 (S53, S59, S67), On the other hand, the printer 17 does not perform any processing corresponding to the instruction from the terminal device 15B which is listed in the communication destination list 72 (S47). According to this configuration, the process to be executed by the printer 17 in response to instructions from multiple terminal devices 15A, 15B, 15C can be changed according to the communication destination list 72 obtained from the server 11.

(4) Even when the printer 17 obtains the communication destination list 72, which is the blacklist, from the server 11 via the terminal device 15A, when the terminal device 15A is listed in the communication destination list 72, the printer 17 may disconnect the communication with the terminal device 15A after obtaining the communication destination list 72 (S41). According to this configuration, after obtaining the communication destination list 72, only the terminal devices 15 not listed in the communication destination list 72 can be made connected to the printer 17.

(5) The printer 17 is a portable image forming device. In the case of a portable imaging device such as a mobile printer, there is a possibility that the portable image forming device may be connected by an unspecified terminal device 15 on a business trip or the like. For this reason, it is extremely beneficial to use a portable image forming device as an image forming device that can change the processing to be performed based on instructions from the terminal device 15 using the communication destination list 72 obtained from the server 11.

(6) In addition, the communication destination list 72 includes information on at least one of the MAC address and Bluetooth (registered trademark) public address of the terminal device 15. Accordingly, by using the MAC address, which is a physical address unique to the device, and the Public Address, it is possible to identify the terminal device 15 based on the communication destination list 72, and appropriate actions such as connection rejection and printing permission can be taken.

(7) Regarding the communication destination list 72 obtained via the terminal device 15A, the printer 17 inquires the server 11 whether or not the list is the communication destination list 27 transmitted from the server 11 (S25). As a result of the inquiry, when the list is the communication destination list 27 transmitted from the server 11, the printer 17 performs the process in S45 and the like based on the communication destination list 72. According to the configuration, it is prevented, for example, that the communication destination list 27, which has expired on the server 11 side, is prevented from being applied to the settings of the printer 17.

(8) In addition, the printer 17 obtains the communication destination list 27 from the server 11 via the terminal device 15A in S13 and S23, regardless of whether the terminal device 15 that relayed the list is the terminal device 15C listed in the communication destination list 27 or the terminal device 15A not listed in the list.

In this way, it is possible to obtain the communication destination list 27 from the server 11 through the terminal device 15. According to this configuration, the communication destination list 27 can be obtained via any terminal device 15 without being restricted by the contents set in the communication destination list 27 as far as the terminal device 15 is capable of communication to acquire the communication destination list 27 from the server 11.

For example, as shown in the above embodiment, it is possible to obtain the communication destination list 27 from all the terminal devices 15 that are capable of communication, provided that the printer itself does not have a communication destination list 72. Alternatively, even if the communication destination list 72 is retained (e.g., the expiration date of the communication destination list 72 has expired), the printer 17 can obtain the communication destination list 27 from the terminal device 15 that is capable of communication without being restricted by the retained communication destination list 72. It is noted that, when the printer 17 retains the old communication destination list 72, it is configured that the communication destination list 27 is obtained only from the terminal devices 15 permitted in the old communication destination list 72.

(9) The printer 17 may be configured such that when at least one of the following conditions is satisfied: the power of the printer 17 is turned on, a particular period of time has elapsed since the printer 17 obtained the communication destination list; and when the printer 17 receives an instruction from the user to obtain the communication destination list, the printer 17 may shift to a state in which the printer 17 permits connection and may obtain the communication destination list 27 from the terminal device 15 that is capable of communication.

According to this configuration, the communication destination list 27 can be updated to the latest destination list 27, for example, every time the user turns on the power. In addition, the communication destination list 27 can be updated to the latest list according to a passage of a particular period of time, such as the passage of the expiration date of the communication destination list 27. In addition, when the user intends to update the list, the list can be updated to the latest communication destination list 27 in response to user instructions.

(10) The printer 17 executes printing with the print engine 64 based on the printing instruction (an example of an image forming instruction) obtained from the terminal device 15C listed in the communication destination list 72 (S59). On the other hand, the printer 17 does not permit the terminal device 15B to connect to the printer 17 when the terminal device 15B is not listed in the communication destination list 72, or does not receive the print instruction therefrom (S47). According to this configuration, among the terminal devices 15 that is capable of communication, the terminal devices 15 that are permitted to allow the printer 17 to perform printing can be managed with use of the communication destination list 72.

(11) When the printer 17 obtains a connection request to the second communication IF 62 from the terminal device 15C listed in the communication destination list 72 (S49), the connection is permitted (S53). On the other hand, when the connection request is obtained from the terminal device 15B that is not listed in the communication destination list 72 (S43), the connection is not permitted (S47). According to this configuration, the terminal devices 15 that are allowed to connect to the printer 17 among the terminal devices 15 that are capable of communication can be managed based on the communication destination list 27 of the server 11.

(12) After obtaining the communication destination list 72 in S23, when the communication is being kept between the printer 17 and the terminal device 15A that is not listed in the obtained communication destination list 72, the printer 17 disconnects the communication with the terminal device 15A (S41). That is, regardless of whether or not the terminal device 15A is a relay terminal device that relays the communication destination list 72 from the sever 11 to the printer 17, when the terminal device 15A is not listed in the obtained communication destination list 72, the connection may be disconnected. In this way, for the terminal devices 15 that were connected before obtaining the communication destination list 72, the connection is disconnected according to the content of the obtained communication destination list 72. It is noted that the settings of the communication destination list 72 can be reflected to the terminal device 15 that has been connected before the setting is performed.

(13) In the communication destination lists 27 and 72, the MAC address (which is an example of identification information) of the terminal device 15 and the processing contents to be permitted for instructions from the terminal device 15 are associated with each other (see FIG. 3). In S57 and S65, when the process instructed by the terminal device 15C which is listed in the communication destination list 72 corresponds to the processing contents permitted in the communication destination list 72, the printer 17 executes the process corresponding to the instructions. According to this configuration, it is possible to determine what type of instructions are received from the terminal device 15 and cause the printer 17 to execute the same based on the processing contents set in the communication destination list 27. According to such a configuration, it is possible to set the terminal device 15 to allow only printing, or to allow printing and setting changes, and the like. Thus, the settings can be made according to the authority of the user of the terminal device 15.

(14) The server 11 is the MDM server and can restrict at least one of restriction of functions and deletion of data of the terminal device 15 can be performed. With use of the server 11, which can execute such functional restrictions, the connection restrictions and processing restrictions of the printer 17 which is used by the terminal device 15 can be managed.

Second Embodiment

Next, the printing system 10 according to a second embodiment of the present disclosures will be described with reference to FIG. 9. In the first embodiment described above, the terminal device 15A requests the server 11 for the communication destination list 27 before requesting the printer 17 for a connection request. In contrast, in the second embodiment, the terminal device 15A firstly transmits a connection request to the printer 17. In the following description, the reference numbers/symbols same as those used in the first embodiment, and the description thereof is omitted for brevity.

Figure 9:
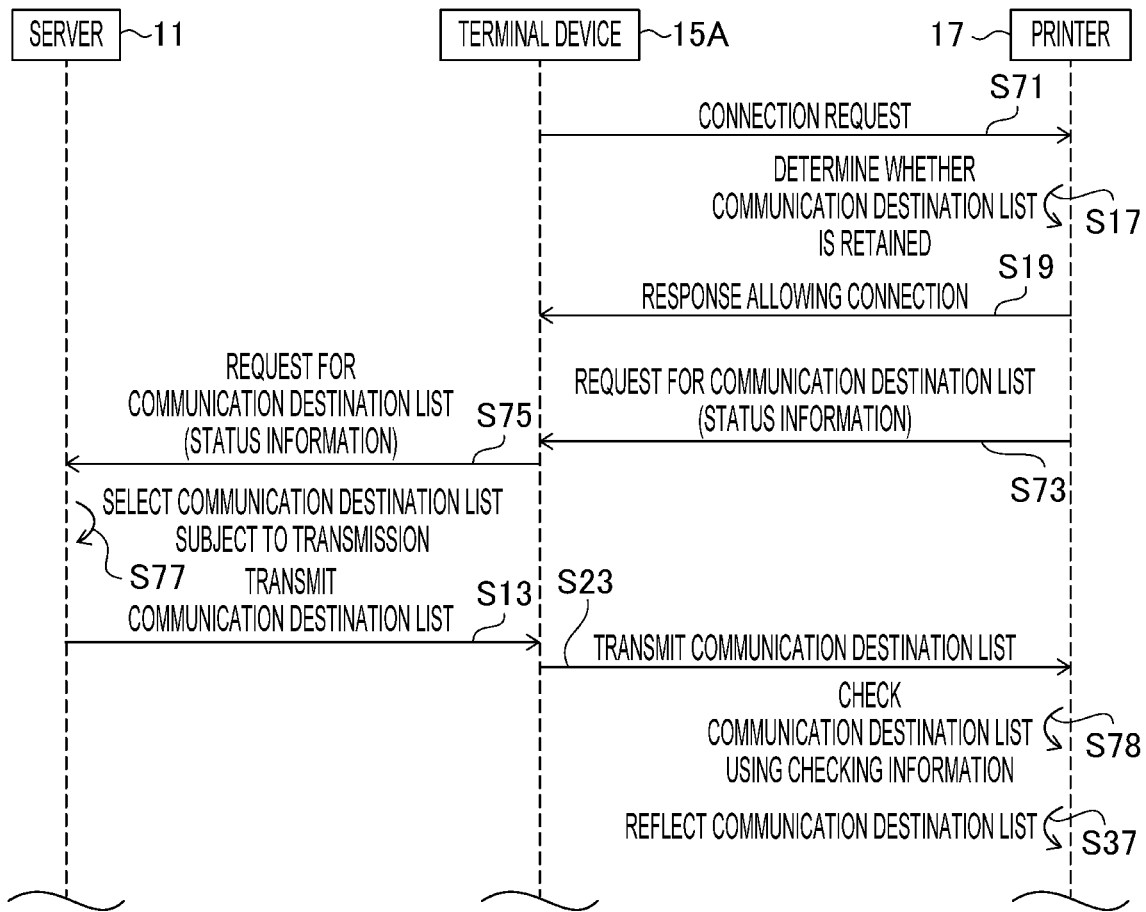
FIG. 9 is a sequence diagram showing processes of the server, the terminal device, and the printer in the communication destination list process according to a second embodiment.

As shown in FIG. 9, the terminal device 15A transmits a connection request to the printer 17 (S71). The terminal device 15A transmits the connection request based on the user's operation input (e.g., an operation to select a printer 17, an operation to start the application 50) (S71). Since the printer 17 does not hold the communication destination list 72 (S17), the printer 17 transmits a response to the terminal device 15A to allow the connection (S19).

Further, the printer 17 requests the server 11 for the communication destination list via the terminal device 15A (S73, S75). At this time, the printer 17 transmits the status information of the printer 17 itself to the terminal device 15 (S73, S75). The status information of the device here is, for example, information indicating what communication method the device is capable of communicating with, such as the wired LAN, Wi-Fi (registered trademark), Bluetooth (registered trademark), NFC, and the like. The server 11 selects the communication destination list 27 to be transmitted based on the status information obtained from the printer 17 (S77).

According to this configuration, when the server 11 has the communication destination lists 27 corresponding to the respective communication methods, e.g., the communication destination list 27 to which the MAC address of the wired LAN interface is set, the communication destination list 27 to which the MAC address of the wireless LAN interface, the communication destination list 27 to which the Public Address of the Bluetooth (registered trademark), the communication destination list 27 to which the NFCID are set, the printer 17 can select and transmit the necessary communication destination list 27 based on the status information (S13, S23). For example, for the printer 17 which is not equipped with the second communication IF 62, but is equipped with only the first communication IF 61 for Bluetooth (registered trademark), only the communication destination list 27 to which the Public Address is set can be selected and transmitted.

Therefore, the information on the status of the device in this specification is the information that serves as the basis for selecting the appropriate communication destination list 27 from among the multiple communication destination lists 27 when multiple communication destination lists 27 exist in the server 11. For this reason, as the status information, information indicating the statuses of various printers 17 that can be used as a basis for selecting the communication destination list 27 can be employed. For example, the status information can be the model number and/or serial number of the printer 17. The status information may be the information of the communication interface of which settings are enabled in the printer 17. In this case, regarding the communication destination list 27 corresponding to the communication interface which is equipped but disabled by the software setting, or the communication interface disabled due to the error, the server 11 can control not to transmit the communication destination list 27 to the printer 17.

When there is a communication destination list 27 in which processing contents such as the printing function, the scanning function, the fax function and the like are set, information on the functions implemented in the printer 17 may be used, in addition to the information on the communication interface, as the status information.

For example, to a printer 17 equipped with only the printing function, a communication destination list 27 to which only the printing function and setting changes are set as the processing contents is transmitted. To a printer 17 equipped with printing and scanning functions, a communication destination list 27 to which the printing function, the scanning function, and the setting changes are set as the processing contents may be transmitted. In this way, the server 11 can send only the necessary communication destination list 27 according to the status of the printer 17.

After obtaining the communication destination list 27 in S13 and S23, the printer 17 checks whether the obtained communication destination list 27 is the communication destination list 27 transmitted from the server 11 (S78). In the first embodiment described above, the printer 17 checks whether the obtained list is the communication destination list 27 transmitted from the server 11 by inquiring the server 11 whether the communication destination list 27 is the list transmitted from the server 11 (S25, S27). In contrast, in the second embodiment, the printer 17 is configured to determine the authenticity of the communication destination list 27.

As shown in FIG. 2 by the broken lines, the printer 17 may use the checking information 76 stored in the printer storage 69 to determine the authenticity of the communication destination list 27 (S78 in FIG. 9). The checking information 76 is, for example, a hash value, a password, a decryption key, or the like. The printer 17 may be configured, for example, to calculate the hash value of the communication destination list 27 obtained in S23 using a particular calculation formula. When the calculated hash value and the checking information 76 (i.e., the hash value) stored, in advance, in the printer controller 67 match, the printer 17 may determine that the communication destination list 27 is the legitimate communication destination list 27 transmitted by the server 11. When the printer 17 determines that the list is the legitimate communication destination list 27, the printer 17 reflects the communication destination list 27 in the settings of the printer 17 itself without executing an inquiry to the server 11 (S37).

Alternatively, the server 11 may be configured to transmit the communication destination list 27 to the server 11 with password-locked. In this case, the printer 17 may determine that the communication destination list 27 is the legitimate communication destination list 27 when the printer 17 is able to unlock the communication destination list 27 using the password of the checking information 76 held by the device.

Alternatively, the server 11 may encrypt the communication destination list 27 using a particular encryption method and transmits the encrypted list to the printer 17. In this case, the printer 17 uses the decryption key indicated by the checking information 76 held by the device to decrypt the communication destination list 27. When the printer 17 is able to decrypt the destination list 27 using the decryption key indicated by the checking information possessed by the printer 17, the printer 17 may determine that the list is the legitimate communication destination list 27.

It is noted that the printer 17 may perform both the above inquiry of authenticity according to the first embodiment and the determination of authenticity of the printer itself using the checking information 76 according to the second embodiment. For example, the printer 17 makes an inquiry to the server 11, and when the printer 17 cannot obtain the result of the inquiry, the printer 17 determines the authenticity based on the checking information 76 and applies the communication destination list 27.

According to the second embodiment above, effects same as those of the first embodiment are achieved.

Optionally, the printer 17 may have checking information 76 (e.g., a hash value, a password, a decryption key, and the like) to determine whether the data was transmitted from the server 11. With regard to the communication destination list 27 obtained via the terminal device 15A, the printer 17 checks whether the data is identical to the data transmitted from the server 11 based on the checking information 76 (S78). When the printer 17 determines, as a result of the checking in S78, that the data is the communication destination list 2 transmitted from the server 11, the printer 17 processes the connection requests, the printing instructions, the setting change instructions, and the like based on the communication destination list 27.

According to the above configuration, there is no need to query the server 11 for authenticity of the communication destination list 27 as in the first embodiment. Therefore, even when communication with the server 11 is not possible, for example, when the query result cannot be obtained from the server 11, the printer 17 can check the authenticity of the communication destination list 27 by the printer 17 itself. In addition, such a configuration reduces the processing load on the server 11 in checking the communication destination list 27.

Third Embodiment

Figure 10:
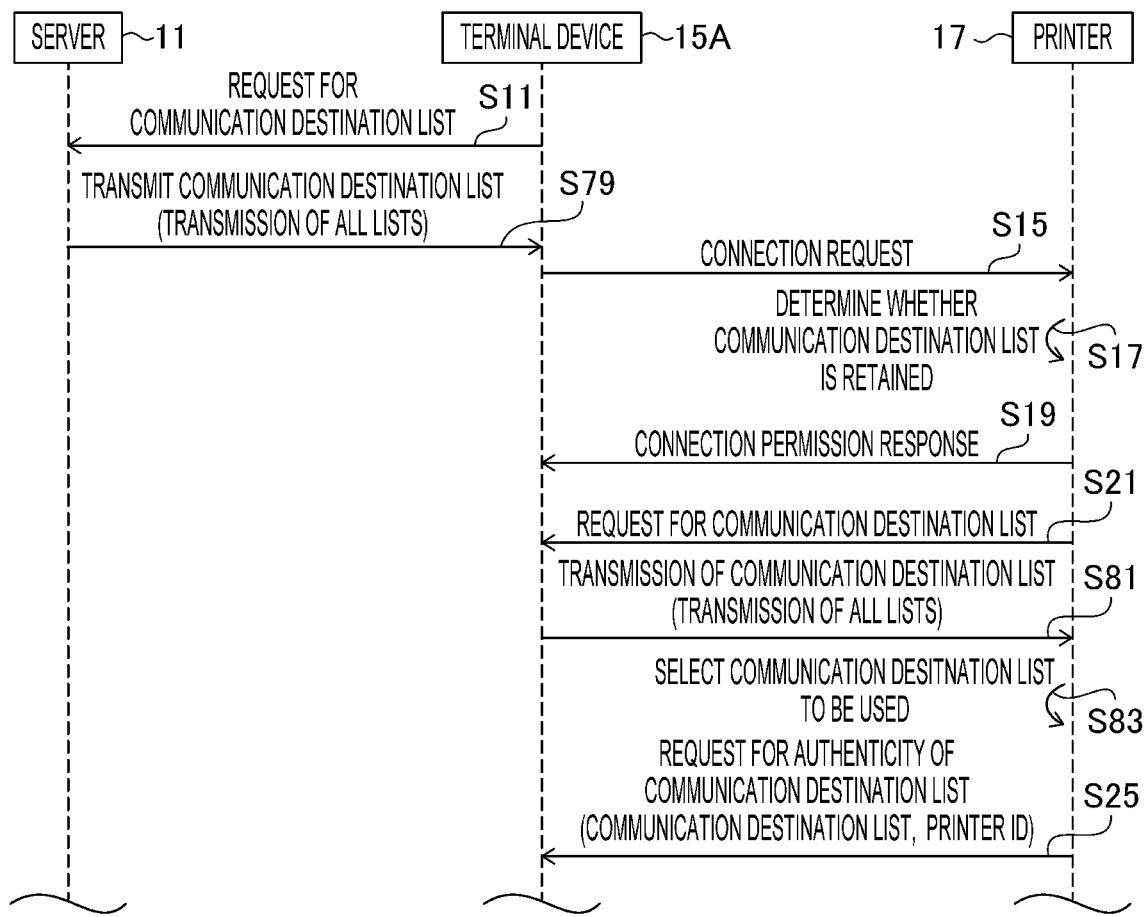
FIG. 10 is a sequence diagram showing processes of the server, the terminal device, and the printer in the communication destination list process according to a third embodiment.

Next, the printing system 10 according to the third embodiment will be described with reference to FIG. 10. In the second embodiment described above, the server 11 is configured to select a communication destination list 27 that is appropriate for the printer 17 (S77). In contrast, in the third embodiment, the printer 17 is configured to select the communication destination list 27.

Similar to the first embodiment, the terminal device 15A requests the server 11 for the communication destination list 27 (S11). When the server 11 receives the request in S11, the server 11 transmits all the communication destination lists 27 held in the sever 11 itself to the terminal device 15A (S79). Then, similar to the first embodiment, the terminal device 15A executes the process from S15 onward. When the terminal device 15A obtains the request in S21, the terminal device 15A transmits all the communication destination lists 27 obtained from the server 11 to the printer 17 (S81).

Then, the printer 17 selects an appropriate communication destination list 27 from among all the communication destination lists 27 obtained from the server 11 via the terminal device 15A, according to the status of the printer 17 itself as described above (S83). For example, when the printer 17 is equipped with only the first communication IF 61 for Bluetooth (registered trademark), the printer selects only the communication destination list 27 to which the Public Address is set, and executes the checking process to check whether the selected communication destination list 27 is transmitted from the server 11 (S25). This allows the printer 17 to perform the connection restriction, and the like using the appropriate communication destination list 27.

According to the third embodiment described above, the effects same as those in the first embodiment are achieved.

Further, in S83, the printer 17 obtains a plurality of communication destination lists 27 from the server 11 and selects a communication destination list 27 to be used in accordance with the status of the printer 17 itself. This allows the printer 17 to select an appropriate communication destination list 27 according to the type of communication interface and the type of communication method equipped with the printer 17 and to execute the connection restrictions and the like. In addition, it becomes unnecessary to have the server 11 check the authenticity of the communication destination list 27.

Fourth Embodiment

Figure 11:
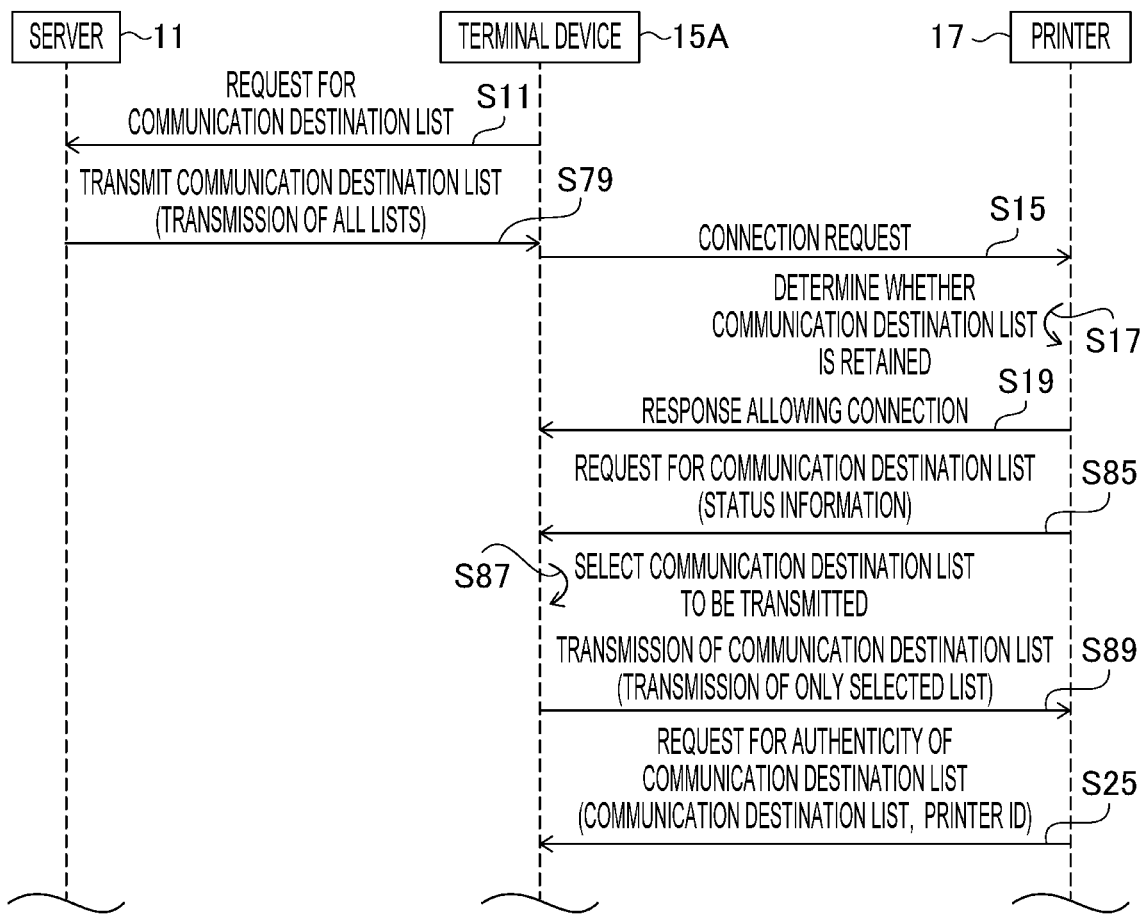
FIG. 11 is a sequence diagram showing processes of the server, the terminal device, and the printer in the communication destination list process according to a fourth embodiment.

Next, the printing system 10 according to the fourth embodiment will be described with reference to FIG. 11. In the third embodiment described above, the printer 17 is configured to select an appropriate communication destination list 27 from among a plurality of communication destination lists 27 obtained from the server 11 (S83). In contrast, according to the fourth embodiment, the terminal device 15A performing the relay function is configured to select the communication destination list 27.

The terminal device 15A is configured to obtain all the communication destination lists 27 from the server 11 in the same manner as in the third embodiment (S79). As in the first embodiment, the printer 17 receives the connection request of S15, and after allowing the connection (S19), the printer 17 requests for the communication destination list 27 and transmits the status information of the printer 17 itself to the terminal device 15A (S85).

Based on the status information obtained from the printer 17, the terminal device 15A selects, from among all the communication destination lists 27 obtained from the server 11, a communication destination list 27 to be transmitted to the printer 17 (S87). Then, the terminal device 15A transmits only the selected communication destination list 27 to the printer 17 (S89). According to this configuration, it becomes possible that the terminal device 15A selects, from among all the communication destination lists 27 obtained from the server 11, an appropriate communication destination list 27 according to the status of the printer 17.

According to the fourth embodiment described above, the effects same as the first embodiment are achieved.

The terminal device 15A is configured to obtain a plurality of communication destination lists 27 from the server 11 (S79), select the communication destination list 27 that corresponds to the status of the printer 17 (S87), and transmit the selected communication destination list 27 to the printer 17 (S89). According to the above configuration, the terminal device 15A can select the communication destination list 27 corresponding to the type of the communication interface and the type of the communication method implemented to the printer 17. In addition, the process of checking the authenticity of the communication destination list 27 by the server 11 and the process of selecting the communication destination list 27 by the printer 17 become unnecessary.

Fifth Embodiment

Figure 12:
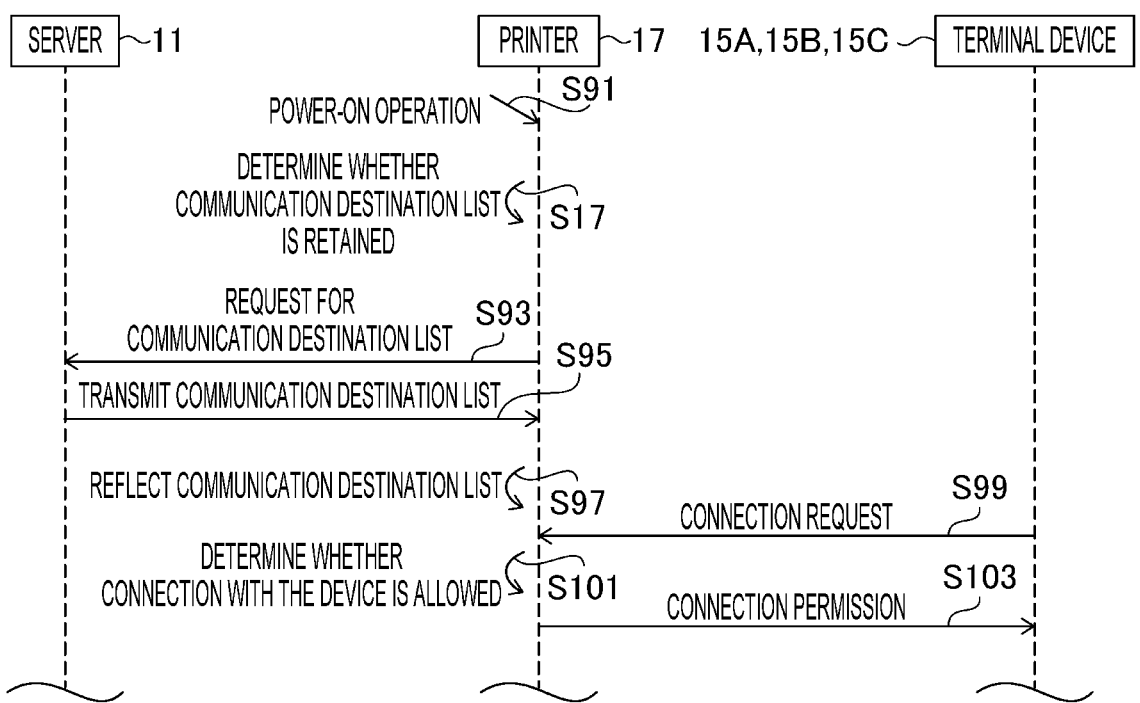
FIG. 12 is a sequence diagram showing processes of the server, the terminal device, and the printer in the communication destination list process according to a fifth embodiment.

Next, the printing system 10 according to the fifth embodiment will be described with reference to FIG. 12. In each of the above embodiments, the printer 17 is configured to obtain the communication destination list 27 from the server 11 via the terminal device 15. In contrast, according to the fifth embodiment, the printer 17 is configured to obtain the communication destination list 27 from the server 11 without going through the terminal device 15.

When the printer 17 is powered on (S91), the printer 17 determines whether the printer 17 retains the communication destination list 72 (S17). When the printer 17 does not retain the communication destination list 27, the printer 17 requests the server 11 for the communication destination list 27 (S93).

The conditions under which the printer 17 requests for the communication destination list 27 from the server 11 are not necessarily limited to the above-mentioned conditions of turning on of the power and not retaining the communication destination list 27. For example, the printer 17 may request the server 11 for the communication destination list 27 when more than a particular period of time has elapsed since the communication destination list 27 was obtained. Alternatively, the printer 17 may request the server 11 for the communication destination list 27 based on an operation input to the user IF 65.

When obtaining the request of S93, the server 11 transmits the communication destination list 27 to the printer 17 (S95). Then, the printer 17 reflects the obtained communication destination list 27 in the settings of the printer 17 itself (S97). Then, the printer 17 processes the connection request, and the like received from the terminal device 15 based on the reflected communication destination list 72 (S99, S101, S103). In this way, when the printer 17 is configured to communicate with the server 11 not via the terminal device 15, the printer 17 may request the server 11 for the communication destination list 27, and obtain the same from the server 11.

Further, when the printer 17 fails to obtain the communication destination list 27 from the server 11, the printer 17 may obtain the communication destination list 27 from the server 11 via the terminal device 15 as in the first through fourth embodiments.

According also to the fifth embodiment, the printer 17 may obtain all the communication destination lists 27 from the server 11 and select the communication destination list 27 to be reflected in the settings based on the status information of the printer 17 itself (S93). Alternatively, the printer 17 may transmit the status information to the server 11 in S93. Then, the server 11 may select the communication destination list 27 to be transmitted to the printer 17 based on the status information.

Modifications

Various embodiments described in detail above are only examples, and do not necessarily limit aspects of the present disclosures. Rather, aspects of the present disclosures include various modifications of the embodiments described above. Examples of such modifications are described below.

The first through fourth embodiments may be modified such that, when the printer 17 obtains the communication destination list 27 via the terminal device 15, the obtained communication destination list 27 may be reflected in the settings without executing the checking process of inquiring the authenticity to the server 11.

When the printer 17 fails to obtain the communication destination list 27 from the server 11, the printer 17 may use the past communication destination list 72 if it is retained in the printer 17 itself.

In the above embodiments, the printer 17 disconnected the communication with the terminal device 15A that was connected in order to obtain the communication destination list 27 if the terminal device 15A is not listed in the obtained communication destination list 27. However, it is not necessary to disconnect the communication with the terminal device 15A. That is, the connection with the terminal device 15 that was connected before the communication destination list 27 is applied may be maintained.

The information to be set in the communication destination lists 27 and 72 is not necessarily limited to the physical address such as the MAC address and Public Address of Bluetooth (registered trademark). The information may be the IP address of the terminal device 15, the terminal ID of the terminal device 15, the application ID of the application 50, identification information set for the terminal device 15 by the system administrator, or the like. In other words, various information can be employed as the information to be set in the communication destination lists 27 and 72 as far as the information identifies the terminal device 15.

The configuration of the printing system 10 in the above embodiments is merely an example and can be modified in various ways. For example, the printing system 10 does not need to be equipped with the management PC 13. Further, the printing system 10 does not need to be equipped with the server 11 (e.g., the MDM server) configured to manage the terminal devices 15.

As an information processing terminal in the above-described embodiments, a smartphone is employed as the terminal device, but information processing terminal does not need to be limited to such a terminal device 15. That is, a desktop PC, a notebook PC, a tablet PC, or other terminal device may be employed as the information processing device.

In the above-described embodiments, the printer 17 is employed as the image forming device, but the image forming device does not need to be limited to the printer 17. That is, the image forming device according to aspects of the present disclosures may also be a label printer, a scanner device, a facsimile device, and the like. When the scanner device or the facsimile device is employed, a scanning engine configured to scan an image is an example of an image forming engine according to aspects of the present disclosures. Further, the image forming device may also be a multifunction peripheral equipped with a facsimile function, a scanning function, a printing function, a copying function, and the like.

In the above-described embodiments, the printer controller 67 having the printer storage 69 is used as the controller, but the controller according to aspects of the present disclosures does not need to have a storage device.

In the above-described embodiments, the printer 17 is configured with the first communication IF 61 and the second communication IF 62, but the printer 17 may be configured to have only one communication IF (e.g., one of the first communication IF 61 and the second communication IF 62). Further, the terminal device 15 may be configured with either the first communication IF 43 or the second communication IF 44.

The server 11 may be configured to manage at least one terminal device 15 with reference to the terminal DB 28. The printing system may be configured such that multiple terminal devices 15 are allowed to communicate with one printer 17, or only one terminal device 15 is allowed to communicate with one printer 17.

The printer 17 does not need to have the template data 74 or the personal information 75.

The storage, in which various programs (e.g., the server program 26, the management program 38, the OS program 49, the application 50, and the printer program 71) are stored, is not necessarily limited to any particular storage device, but may be a ROM, a flash memory, or the like. The storage configured to store various programs may be a non-transitory computer-readable storage medium. As the computer-readable storage medium, recording media such as a CD-ROM, a DVD-ROM, and the like may be employed in addition to the above-described examples.

It is noted that the printer 17 is an example of an image forming device according to aspects of the present disclosures. The first communication IF 61 and the second communication IF 62 are examples of communication interfaces. The print engine 64 is an example of an image forming engine. The printer controller 67 is an example of a controller. The terminal device 15C is an example of the first terminal device. The terminal device 15A is an example of a relaying terminal device. The terminal device 15B is an example of a second terminal device. The application 50 is an example of a program. It is noted that S47, S53, S57, S59, S65, and S67 are examples of a process corresponding to instruction. S41 is an example of disconnecting. Further, S25 is an example of inquiring. Further, S78 in the second embodiment is an example of checking. Still further, S83 in the third embodiment is an example of obtaining.

What is claimed is:

1. An image forming device, comprising:
an image forming engine;
a communication interface configured to communicate with terminal devices; and
a controller,
wherein the controller is configured to perform:
obtaining, from an external device, a communication destination list in which statuses of the image forming device and one or more of the terminal devices are stored; and
for each of the one or more of the terminal devices, executing a process corresponding to an instruction from the terminal device or restricting a process corresponding to the instruction from the terminal device depending on whether the terminal device is included in the communication destination list obtained in the obtaining.

2. The image forming device according to claim 1,
wherein the communication destination list contains at least a first terminal device included in the one or more of the terminal devices, and
wherein the controller is configured to perform, in the executing:
in response to an instruction from the first terminal device listed in the communication destination list obtained in the obtaining, performing a process corresponding to the instruction from the first terminal device; and
in response to an instruction from a second terminal device which is not listed in the communication destination list, restricting a process corresponding to the instruction from the second terminal device.

3. The image forming device according to claim 2,
wherein the external device is a relaying device, and
wherein, when the relaying device is not included in the communication destination list, the controller is configured to disconnect a communication with the relaying device after obtaining the communication destination list.

4. The image forming device according to claim 1,
wherein the communication destination list does not include at least a first terminal device as a device included in the one or more of the terminal devices, and
wherein the controller is configured to perform, in the executing:
in response to an instruction from the first terminal device which is not included in the communication destination list obtained in the obtaining, performing a process corresponding to the instruction from the first terminal device; and
in response to an instruction from a second terminal device which is included in the communication destination list, restricting a process corresponding to the instruction from the second terminal device.

5. The image forming device according to claim 2,
wherein the external device is a relaying device, and
wherein, when the relaying device is included in the communication destination list, the controller is configured to disconnect a communication with the relaying device after obtaining the communication destination list.

6. The image forming device according to claim 1,
wherein the image forming device is a portable device.

7. The image forming device according to claim 1,
wherein the communication destination list contains at least one of a MAC address and a Public Address of Bluetooth (registered trademark) for at least one or more of the terminal devices.

8. The image forming device according to claim 1,
wherein the external device is a relaying terminal device,
wherein the controller is configured to perform:
inquiring a server whether the communication destination list obtained from the relaying terminal device is identical to the communication destination list transmitted from the server; and
when, as a result of the inquiring, the communication destination list obtained from the relaying terminal device is identical to the communication destination list transmitted by the server, executing a process corresponding to the instruction based on the communication destination list.

9. The image forming device according to claim 1,
wherein the external device is a relaying terminal device,
wherein checking information used to check whether data is identical to data transmitted from the server is stored in the image forming device,
wherein the controller is configured to perform:
obtaining the communication destination list from the relaying terminal device in the obtaining;
checking whether the communication destination list obtained from the relaying terminal device is identical to the data transmitted from the server based on the checking information; and
when, as a result of the checking, the communication destination list obtained from the relaying terminal device is identical to the communication destination list transmitted by the server, executing a process corresponding to the instruction based on the communication destination list.

10. The image forming device according to claim 2,
wherein the external device is a relaying terminal device,
wherein, in the obtaining, the controller is configured to obtain the communication destination list from the relaying terminal device regardless of whether the relaying terminal device is the first terminal device or the second terminal device.

11. The image forming device according to claim 4,
wherein the external device is a relaying terminal device,
wherein, in the obtaining, the controller is configured to obtain the communication destination list from the relaying terminal device regardless of whether the relaying terminal device is the first terminal device or the second terminal device.

12. The image forming device according to claim 1,
wherein the controller is further configured to perform the obtaining when at least one of conditions below is met:
a condition in which the image forming device is powered on;
a condition in which a particular time period has elapsed since the communication destination list was obtained in the obtaining; and
a condition in which an instruction to obtain the communication destination list is received from a user.

13. The image forming device according to claim 1,
wherein, in the obtaining, the controller is configured to:
obtain multiple communication destination lists from the external device; and
select one of the multiple communication destination lists to be used in a process corresponding to the instruction based on a state of the image forming device.

14. The image forming device according to claim 1,
wherein the external device is a relaying terminal device,
wherein the controller is configured to obtain, in the obtaining, the communication destination list from the server from the relaying terminal device, and
wherein the relaying terminal device is configured to:
obtain multiple communication destination lists from the server;
select one communication destination list from among the obtained multiple communication destination lists based on a status of the image forming device; and
transmit the communication destination list as selected to the image forming device.

15. The image forming device according to claim 1,
wherein the controller is configured to, in the process corresponding to the instruction:
perform image formation with the image forming engine based on image forming instruction obtained from the first terminal device; and
not perform image formation with the image forming engine based on the image forming instruction obtained from the second terminal device.

16. The image forming device according to claim 4,
wherein the controller is configured to, in the process corresponding to the instruction:
perform image formation with the image forming engine based on image forming instruction obtained from the first terminal device; and
not perform image formation with the image forming engine based on the image forming instruction obtained from the second terminal device.

17. The image forming device according to claim 1,
wherein the controller is configured to, in the process corresponding to the instruction:
allow a connection when a request for connection from the first terminal device to the communication interface is obtained; and
not allow a connection when a request for connection from the second terminal device to the communication interface is obtained.

18. The image forming device according to claim 4,
wherein the controller is configured to, in the process corresponding to the instruction:
allow a connection when a request for connection from the first terminal device to the communication interface is obtained; and
not allow a connection when a request for connection from the second terminal device to the communication interface is obtained.

19. The image forming device according to claim 2,
wherein, when a communication with the second terminal device which is not listed in the obtained communication destination list is kept after execution of the obtaining, the controller is configured to disconnect the communication.

20. The image forming device according to claim 2,
wherein the communication destination list contains identification information of one or more terminal devices and processes to be allowed in response to instructions from the terminal device in an associated manner, and
wherein, in the process corresponding to the instruction, when a process instructed by the first terminal device corresponds to a process allowed in the communication destination list, the controller is configured to execute the process corresponding to the instruction.

21. The image forming device according to claim 1,
wherein the external device is a server, and wherein the server is configured to perform, for at least one terminal device, at least one of restricting functions and deleting data.

22. An image forming device, comprising:

an image forming engine;

a communication interface configured to communicate with a terminal device; and a controller, wherein the controller is configured to perform:

obtaining a communication destination list in which at least a first terminal device is listed from among one or more terminal devices from an external device configured to obtain statuses of the image forming device and one or more terminal devices and store the obtained statuses;

in response to an instruction from the first terminal device listed in the communication destination list obtained in the obtaining, executing a process corresponding to the instruction from the first terminal device; and in response to an instruction from the second terminal device not listed in the communication destination list, restricting a process corresponding to the instruction from the second terminal device.

23. An image forming device, comprising:

an image forming engine;

a communication interface configured to communicate with a terminal device; and a controller, wherein the controller is configured to perform:

obtaining a communication destination list in which at least a first terminal device is not listed from among one or more terminal devices from an external device configured to obtain statuses of the image forming device and one or more terminal devices and store the obtained statuses;

in response to an instruction from the first terminal device not listed in the communication destination list obtained in the obtaining, executing a process corresponding to the instruction from the first terminal device; and in response to an instruction from the second terminal device listed in the communication destination list, restricting a process corresponding to the instruction from the second terminal device.

24. A non-transitory computer-readable recording medium of a terminal device capable of communicating with an image forming device provided with an image forming engine, a communication interface configured to communicate with the terminal device, and a controller, wherein the non-transitory computer-readable recording medium containing computer-executable instructions which cause, when executed by a computer of the terminal device, the computer to perform:

obtaining, from an external device, a communication destination list in which statuses of the image forming device and one or more of the terminal devices are stored; and causing the image forming device to executed, for each of the one or more of the terminal devices, a process corresponding to an instruction from the terminal device or restricting a process corresponding to the instruction from the terminal device depending on whether the terminal device is included in the communication destination list obtained in the obtaining.

* * * * *